US011762531B2

(12) United States Patent
Hsu et al.

(10) Patent No.: US 11,762,531 B2
(45) Date of Patent: Sep. 19, 2023

(54) STATEFUL WIDGET CONTAINER MANAGEMENT FOR INTERACTIVE DESIGNS

(71) Applicant: Axure Software Solutions, Inc., San Diego, CA (US)

(72) Inventors: Victor Hsu, San Diego, CA (US); Martin Smith, San Diego, CA (US); Rachel Lauren Brown, San Diego, CA (US); Cass Crockatt, San Diego, CA (US); Francis Costa, San Diego, CA (US); Robert Gourley, San Diego, CA (US)

(73) Assignee: Axure Software Solutions, Inc., San Diego, CA (US)

( * ) Notice: Subject to any disclaimer, the term of this patent is extended or adjusted under 35 U.S.C. 154(b) by 0 days.

(21) Appl. No.: 16/949,406

(22) Filed: Oct. 28, 2020

(65) Prior Publication Data

US 2022/0129118 A1 Apr. 28, 2022

(51) Int. Cl.
*G06F 3/0482* (2013.01)
*G06F 3/0485* (2022.01)
*G06F 3/04845* (2022.01)

(52) U.S. Cl.
CPC .......... *G06F 3/0482* (2013.01); *G06F 3/0485* (2013.01); *G06F 3/04845* (2013.01)

(58) Field of Classification Search
CPC ... G06F 3/0482; G06F 3/04845; G06F 3/0485
See application file for complete search history.

(56) References Cited

U.S. PATENT DOCUMENTS

| 6,750,858 B1 | 6/2004 | Rosenstein |
| 7,225,424 B2 | 5/2007 | Cherdron et al. |
| 7,251,778 B1 | 7/2007 | Hill et al. |

(Continued)

FOREIGN PATENT DOCUMENTS

| AU | 2008261147 A1 * | 7/2010 | ........... G06F 9/4443 |
| AU | 2009202142 A1 * | 12/2010 | ............... G06F 8/34 |

OTHER PUBLICATIONS

Office Action dated Mar. 24, 2021 for U.S. Appl. No. 16/779,311.
(Continued)

*Primary Examiner* — Kieu D Vu
*Assistant Examiner* — Alvaro R Calderon, IV
(74) *Attorney, Agent, or Firm* — MLO, a professional corp.

(57) ABSTRACT

A method involves identifying state views of a stateful widget container in a design tool having a canvas design context and an all-states view design context, each state view of the stateful widget container being associated with a unique state of the stateful widget container. A first state view of the stateful widget container is displayed in the canvas design context, no other state view of the stateful widget container being displayed concurrently in the canvas design context. The state views of the stateful widget container are displayed concurrently in the all-states view design context, an internal widget layout of each state view corresponding to that displayed in the canvas design context. A first user input is received at a first interactive widget within the stateful widget container in the all-states view design context, the first interactive widget being associated with the first state view of the stateful widget container.

24 Claims, 20 Drawing Sheets

(56) References Cited

U.S. PATENT DOCUMENTS

| | | | |
|---|---|---|---|
| 7,475,346 B1 | 1/2009 | Bullock et al. | |
| 7,890,853 B2 | 2/2011 | Neil et al. | |
| 7,954,068 B2 | 5/2011 | Riggs et al. | |
| 8,166,402 B2 | 4/2012 | Collins et al. | |
| 8,671,352 B1* | 3/2014 | Hsu | G06T 11/60 715/762 |
| 8,938,679 B1* | 1/2015 | Hsu | G06F 40/169 715/751 |
| 9,773,264 B2 | 9/2017 | Brown et al. | |
| 9,792,270 B2 | 10/2017 | Kloiber et al. | |
| 10,275,265 B1 | 4/2019 | Gould et al. | |
| 10,685,155 B2 | 6/2020 | Wang | |
| 2003/0009567 A1 | 1/2003 | Farouk | |
| 2003/0020671 A1* | 1/2003 | Santoro | G09G 5/14 345/1.3 |
| 2003/0222912 A1* | 12/2003 | Fairweather | G06F 9/4494 715/763 |
| 2004/0001106 A1 | 1/2004 | Deutscher et al. | |
| 2005/0216882 A1 | 9/2005 | Sundararajan et al. | |
| 2006/0236264 A1 | 10/2006 | Cain et al. | |
| 2006/0259875 A1* | 11/2006 | Collins | G06F 40/106 715/853 |
| 2008/0155457 A1* | 6/2008 | Ittel | G06F 9/451 715/781 |
| 2009/0144652 A1* | 6/2009 | Wiley | G06F 9/451 715/788 |
| 2009/0178008 A1* | 7/2009 | Herz | G06F 3/0488 715/840 |
| 2010/0138778 A1* | 6/2010 | Dewan | G06F 9/451 715/789 |
| 2010/0153865 A1* | 6/2010 | Barnes | H04L 67/10 715/762 |
| 2011/0004820 A1 | 1/2011 | Kloiber et al. | |
| 2013/0167080 A1* | 6/2013 | Ari | G06F 3/0481 715/801 |
| 2014/0282365 A1* | 9/2014 | Hsu | G06F 3/0484 717/105 |
| 2014/0337706 A1* | 11/2014 | Hsu | G06F 16/958 715/234 |
| 2014/0337768 A1* | 11/2014 | Hsu | G06F 40/197 715/760 |
| 2015/0143270 A1 | 5/2015 | Hsu et al. | |
| 2015/0169517 A1* | 6/2015 | Hsu | G06F 40/143 715/234 |
| 2016/0034144 A1* | 2/2016 | Hsu | G06F 3/04845 715/763 |
| 2016/0103797 A1* | 4/2016 | Greenberg | G06F 40/186 715/277 |
| 2016/0357373 A1* | 12/2016 | Greenberg | G09G 5/005 |
| 2017/0083296 A1 | 3/2017 | Rempell et al. | |
| 2017/0293596 A1 | 10/2017 | Hsu et al. | |
| 2018/0181378 A1* | 6/2018 | Bakman | G06F 8/65 |
| 2018/0259927 A1* | 9/2018 | Przybylski | G05B 15/02 |
| 2019/0028531 A1* | 1/2019 | Nagar | G06F 8/34 |
| 2019/0121617 A1 | 4/2019 | Shack et al. | |
| 2019/0310844 A1 | 10/2019 | Mills et al. | |
| 2020/0089396 A1 | 3/2020 | Shrivastava et al. | |
| 2020/0097129 A1* | 3/2020 | Dykan | G06F 3/0486 |
| 2020/0133642 A1 | 4/2020 | Payne | |

OTHER PUBLICATIONS

Office Action dated Aug. 27, 2021 for U.S. Appl. No. 17/012,750.
Anonymous: "Creating a mobile-friendly web page with Dreamweaver CS5.5-Tutorial—Dreamweaver Club", Jan. 17, 2013 (Jan. 17, 2013), P055812201, Retrieved from the Internet: URL:https://web.archive.org/web/20130117161029/http://www.dreamweaverclub.corn/mobile--- friendly.php.
Office Action dated Jun. 15, 2021 for European Patent Office Patent Application No. 14794970.5.
Containers, Proto.Io, Accessed on Aug. 5, 2020, 8 pages, https://support.proto.io/hc/en-us/articles/219602088-Containers.
Dynamic Panel Widgets, Axure Docs, Axure Software Solutions, Inc., Accessed on Aug. 5, 2020, 11 pages, https://docs.axure.com/axure-rp/reference/dynamic-panels/.
Dynamic Panels, JustinMind.com, Accessed on Aug. 5, 2020, 6 pages, https://www.justinmind.com/support/dynamic-panels/.
European Search Report dated Mar. 31, 2022 for European Patent Office Patent Application No. 19852896.0.
Notice of Allowance and Fees dated Apr. 5, 2022 for U.S. Appl. No. 17/012,750.
Office Action dated Apr. 29, 2022 for U.S. Appl. No. 17/305,767.
Office Action dated May 27, 2022 for U.S. Appl. No. 16/569,963.
Office Action dated Dec. 22, 2021 for U.S. Appl. No. 17/012,750.
Office Action dated Nov. 15, 2021 for U.S. Appl. No. 16/569,963.
Padmavathi Mundur et al., "Keyframe-based video summarization using Delaunay clustering," 2006 [retrieved on Nov. 6, 2021], International Journal on Digital Libraries (2006), pp. 219-232, downloaded from :https://link.springer.com/content/pdf/10.1007/s00799-005-0129-9.pdf. (Year: 2006).
Notice of Allowance and Fees dated Sep. 14, 2022 for U.S. Appl. No. 17/305,767.
Office Action dated Aug. 18, 2022 for U.S. Appl. No. 16/569,963.
Notice of Allowance and Fees dated Jan. 5, 2023 for U.S. Appl. No. 16/569,963.

* cited by examiner

US 11,762,531 B2

STATEFUL WIDGET CONTAINER MANAGEMENT FOR INTERACTIVE DESIGNS

BACKGROUND OF THE INVENTION

Interactive design prototyping software applications are used to create interactive designs representing desired changes to production software applications that are used within web browsers, computer desktop applications, mobile devices, vehicles, stand-alone terminals such as point of sale systems and kiosks, among other uses. Interactive designs typically include design elements such as images, rendered graphics, videos, and animations, as well as interactive widgets which can receive and respond to user input from a touch screen, a mouse, a physical dial, a physical button, and so on. Interactive designs, their associated design elements and interactive widgets correspond to respective data elements such as assets, content, and corresponding metadata that can include one or more sets of compiled instructions (e.g., JAVA), scripted instructions (JAVASCRIPT, PYTHON, PHP), mark-up and layout instructions (HTML, CSS, XML), redline markups, layout measurements, or other metadata (e.g., JSON, SQL, data objects, etc.). Interactive widgets which respond to received user input include graphical buttons, sliders, text input boxes, drop-down menus, scroll-bars, and other inputs. One or more actions are typically taken within the interactive design in response to receiving user input at a design element or interactive widget. For example, receiving user input at a button of an interactive design might change an image that is displayed within an image viewer design element of the interactive design.

One class of interactive widgets are "stateful widget containers", which are interactive widgets that are operable to contain, group, organize, or otherwise manage one or more other interactive widgets "placed" within the stateful widget container. Stateful widget containers are associated with one or more "state view" properties. Each state view of the stateful widget container is associated with a unique state (i.e., a "state view") of the stateful widget container. Such stateful widget containers may display contained interactive widgets in accordance with a first configuration for a first state view and display the contained interactive widgets in accordance with a second configuration for a second state view.

Some conventional design tools for generating interactive designs provide a user of the design tool with a thumbnail display or a hierarchical display (e.g., a tree-view) to view and manage stateful widget containers.

SUMMARY OF INVENTION

In some embodiments, a method involves identifying, in a design tool having a canvas design context and an all-states view design context, multiple state views of a stateful widget container, each state view of the stateful widget container being associated with a unique state of the stateful widget container. The stateful widget container is displayed in the canvas design context in accordance with a first state view of the multiple state views, no other state view of the stateful widget container being displayed concurrently in the canvas design context. The multiple state views of the stateful widget container are displayed concurrently in the all-states view design context, an internal widget layout of each state view corresponding to that of the state view when displayed in the canvas design context. A first user input is received at a first interactive widget within the stateful widget container in the all-states view design context, the first interactive widget being associated with the first state view of the stateful widget container.

DETAILED DESCRIPTION OF THE EMBODIMENTS

Figure 1:
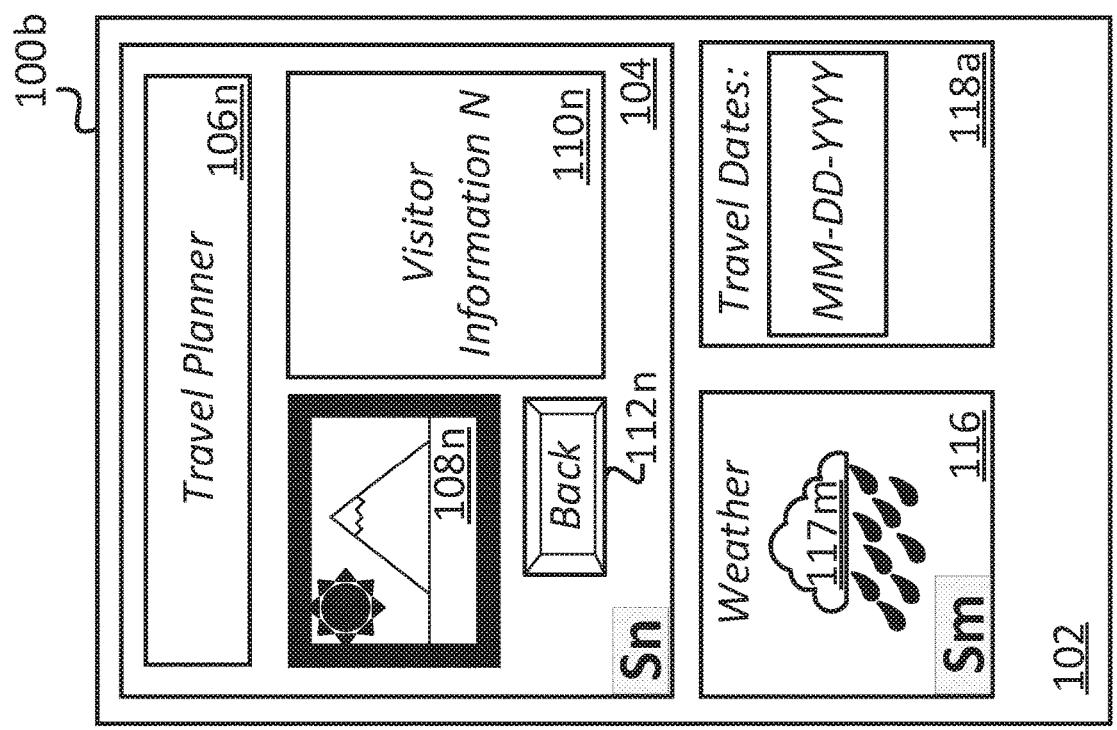
FIG. 1 illustrates a simplified example of an interactive design, in accordance with some embodiments.
Figure 1:
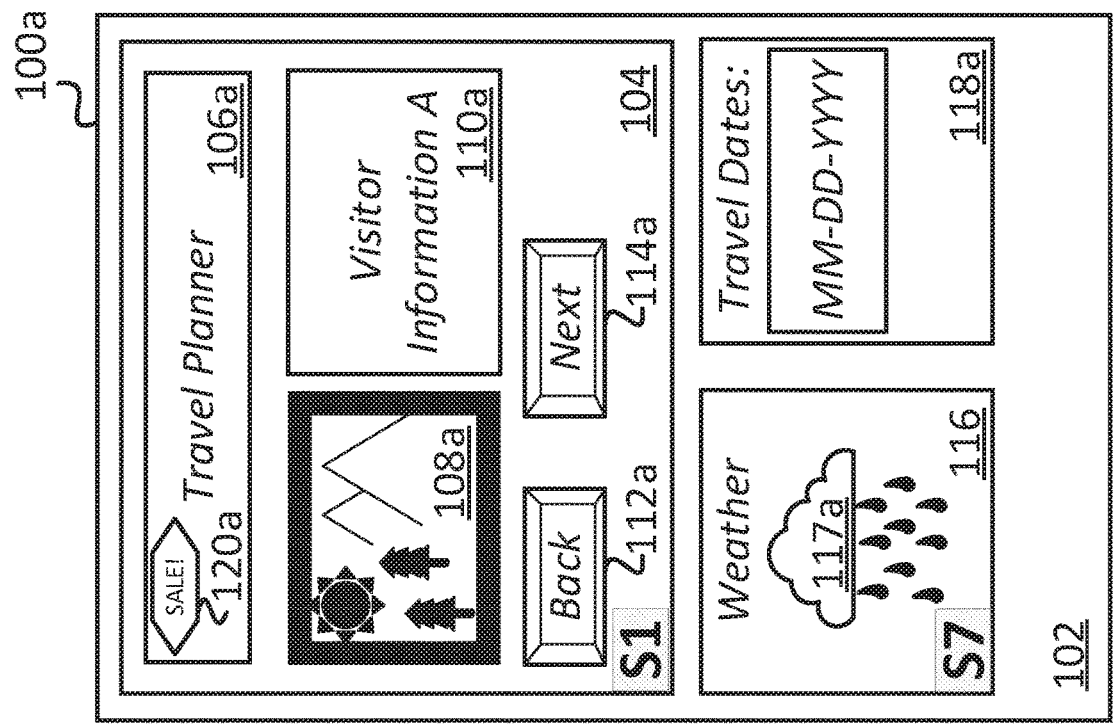

Interactive design prototyping tools are used to create interactive graphical designs to be used within web browsers, desktop applications, mobile devices, vehicles, stand-alone terminals such as point of sale systems and kiosks, among other uses. Interactive designs typically include multi-media design elements such as images, rendered graphics, videos, and animations, as well as interactive widgets which can receive user input from a touch screen, a mouse, a physical dial, a physical button, a physical slider, or another input. Interactive graphical designs and their associated design elements also have respective corresponding data elements such as assets (e.g., images, videos), content (e.g., text), and metadata that can include one or more sets of compiled instructions (e.g., JAVA), scripted instructions (e.g., JAVASCRIPT, PYTHON, PHP), mark-up and layout instructions (e.g., HTML, CSS, XML), redline markups, layout measurements, or other data (e.g., JSON, SQL, data objects, etc.). An interactive widget is a design element having graphical properties and is responsive to and/or may trigger actions, based on user input or system events. Interactive widgets which can receive user input include graphical buttons, sliders, text input boxes, drop-down menus, scroll-bars, and other design elements known in the art.

One class of interactive widgets are "stateful widget containers", which are interactive widgets that are operable to contain, group, organize, or otherwise manage one or more interactive widgets graphically "placed" within the stateful widget container. Stateful widget containers are associated with one or more "state view" properties. Each state view of the stateful widget container is associated with a unique state (i.e., a "state view" of the stateful widget container. Such stateful widget containers may display contained interactive widgets and other design elements in accordance with a first configuration for a first state view and display the contained interactive widgets and design elements in accordance with a second configuration for a second state view.

Some conventional design tools for generating interactive designs provide a user of the design tool with a thumbnail display or a hierarchical display (e.g., a tree-view) to view and manage stateful widget containers. Such conventional tools however do not provide for concurrent interaction and editing between a stateful widget container across multiple state views. That is, such conventional tools typically enable a user to edit a stateful widget container with respect to a first state view, or a second state view exclusively, but do not enable the user to edit the stateful widget container with respect to the first state view and the second state view concurrently.

As disclosed herein, "stateful widget container management" advantageously enables a user of an interactive design prototyping tool to concurrently create, edit, manage, debug, interact with, and modify multiple state views of multiple stateful widget containers concurrently. Such stateful container management advantageously simplifies a design process flow for the user, reduces errors, helps a user optimize an interactive design, and helps a user visualize an interactive design across multiple state views and in accordance with multiple interactions, among other benefits described herein.

FIG. 1 illustrates two views 100a and 100b of a simplified example of an interactive graphical design ("interactive design") 102, as viewed by an end user (e.g., via a web browser, a mobile application, etc.), in accordance with some embodiments. The interactive design 102 generally includes a first stateful widget container 104 (which is itself an interactive widget), a second stateful widget container 116, and a text entry widget 118a. A first view 100a of the interactive design 102 is shown in accordance with a first state view S1 of the first stateful widget container 104 and a seventh state view S7 of the second stateful widget container 116. A second view 100b of the interactive design 102 is shown in accordance with an nth state view Sn of the first stateful widget container 104 and an mth state view Sm of the second stateful widget container 116.

In accordance with the first view 100a of the interactive design 102, the first stateful widget container 104 includes a header interactive widget 106a, a text display interactive widget 120a, a multimedia interactive widget 108a (e.g., including one or more of audio, video, and image assets), a text display interactive widget 110a, a back button interactive widget 112a, and a next button interactive widget 114a. In accordance with the second view 100b of the interactive design 102, the first stateful widget container 104 includes a header interactive widget 106n, a multimedia interactive widget 108n (e.g., including one or more of audio, video, and image assets), a text display interactive widget 110n, and a back button interactive widget 112n.

In accordance with the first view 100a of the interactive design 102, the second stateful widget container 116 includes a first weather status interactive widget (a "weather icon") 117a. In accordance with the second view 100b of the interactive design 102, the second stateful widget container 116 includes a second weather status widget 117m.

Based on selections within the interactive design 102 made by a user (e.g., selecting the next button widget 114a or entering a date in the text entry widget 118a), the first stateful widget container 104 and/or the second stateful widget container 116 are displayed in accordance with a state view that corresponds to the selections made by the user. For example, if a user enters a date into the text entry widget 118a that is forecasted to be a sunny day, the second stateful widget container 116 could be displayed in accordance with a state view (not shown) that shows a sunny weather widget.

Figure 2:
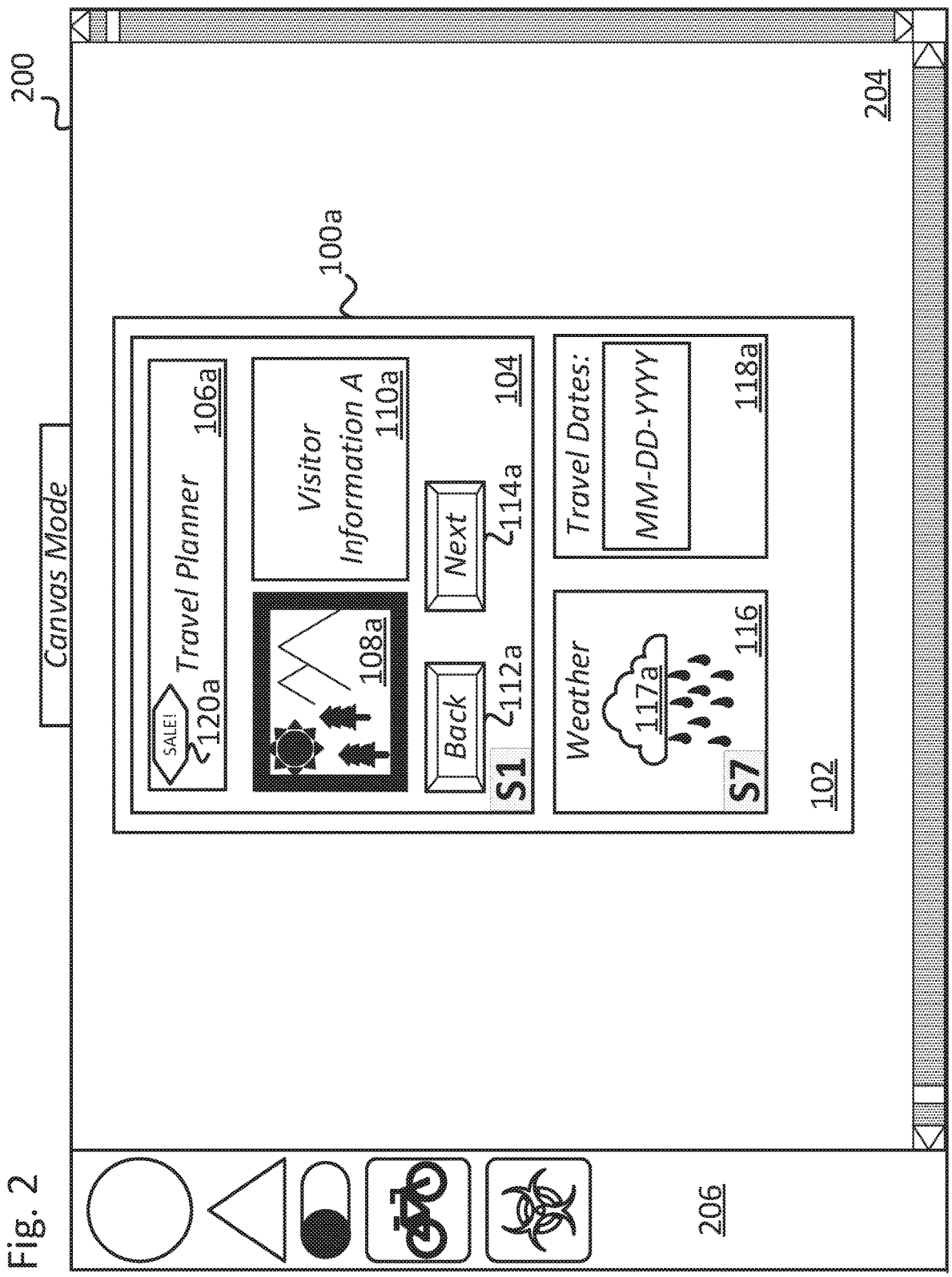
FIG. 2 illustrates a simplified example of a canvas design context of a design tool, in accordance with some embodiments.

FIG. 2 illustrates a simplified example of a canvas design context (i.e., a canvas mode) of an interactive design prototyping tool ("design tool") 200, in accordance with some embodiments. The design tool 200 generally includes a canvas display region 204 (a "canvas design context") and menus 206.

The menus 206 may include menus to add, remove, adjust, inspect, modify, style, and/or interact with interactive widgets that are to be added to, or are already placed in, the canvas display region 204. Additionally, the menus 206 may include menus to show, configure, and/or trigger interactions between interactive widgets, show and hide elements of an interactive design, generate or export an interactive design prototype, and/or change a mode of the design tool 200, among other functionality.

The canvas display region 204 is a region of the design tool 200 in which a user can create, arrange, size, group, modify, style, and/or otherwise interact with design elements and interactive widgets of a design to enable a user to form an interactive prototype in a "what you see is what you get" (WYSIWYG) manner, as well as to provide a visual representation of other aspects of the design which may not appear in the final interactive prototype. That is, the canvas display region 204 provides an accurate (ranging from closely accurate to exactly accurate) visual representation, or provides another, or additional, indication, of how a prototype generated by the design tool 200 will appear. In some instances, visual representations may be made in the canvas display region 204 which do not appear in a prototype generated by the design tool 200. Such visual representations may include aspects of a design which provide information to a user of the design tool 200 but do not appear to an end user of a prototype generated by the design tool 200.

A given stateful widget container when displayed in the canvas display region 204 is exclusively displayed within the canvas display region 204 in accordance with a single state view. Of course, there may be multiple copies of the stateful widget container, but each unique copy is exclusively displayed in accordance with a single state view at a time.

In the example shown, the canvas display region 204 is displaying the first view 100a of the interactive design 102. The first stateful widget container 104 is displayed in accordance with state view S1 of the first stateful widget container 104 and the second stateful widget container 116 are displayed in accordance with state S7 of the second stateful widget container 116. If the first stateful widget container 104 were to be displayed in accordance with a different state view of the first stateful widget container 104, the first stateful widget container 104 would be exclusively displayed in accordance with that different state view and would no longer be displayed in accordance with the first state view S1 of the first stateful widget container 104.

Likewise, if the second stateful widget container 116 were to be displayed in accordance with a different state view of the second stateful widget container 116, the second stateful widget container 116 would be exclusively displayed in accordance with that different state view and would no longer be displayed in accordance with the seventh state view S7 of the second stateful widget container 116.

Figure 3A:
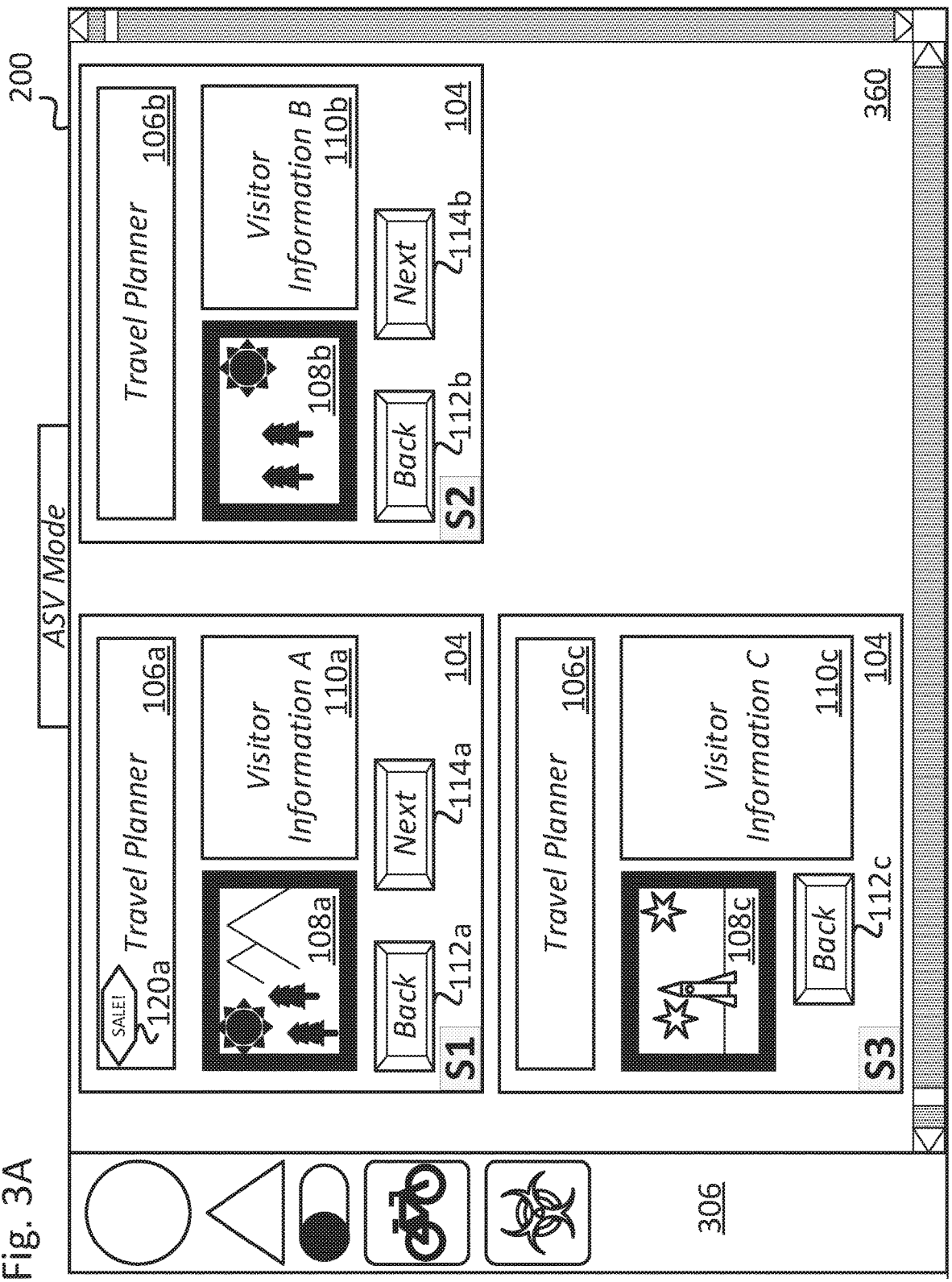
FIG. 3A through FIG. 3E illustrate simplified examples of an all-states view design context of the design tool shown in FIG. 2, in accordance with some embodiments.

FIG. 3A illustrates a simplified example of an all-states view (ASV) context (or "mode") of the design tool 200, in accordance with some embodiments. In the all-states view design context, the design tool 200 generally includes an all-states view region 360 (an "all-states view design context") and menus 306. The menus 306 may include all or a subset of the menus 206 and may include additional menus that are not part of the menus 206. In the example shown, the all-states view region 360 shows the first stateful widget container 104 in accordance with a first state view S1, a second state view S2, and a third state view S3. In accordance with the first state view S1, the first stateful widget container 104 includes interactive widgets 106a, 108a, 110a, 112a, 114a, and 120a, positioned as shown. In accordance with the second state view S2, the first stateful widget container 104 includes interactive widgets 106b, 108b, 110b, 112b, and 114b, positioned as shown. In accordance with the third state view S3, the first stateful widget container 104 includes interactive widgets 106c, 108c, 110c, and 112c, positioned as shown. As shown, an internal widget layout (i.e., a size and/or relative graphical position of interactive widgets contained by the stateful widget container) of each state view (e.g., S1, S2, S3) advantageously "corresponds" to that of the respective state view when the respective state view is displayed in the canvas design context 204 (e.g., state view S1 as shown in FIG. 2), as well as in a rendered view (e.g., as shown in FIG. 1). In some embodiments, "corresponds" is taken to mean exactly matching in graphical detail and/or an internal graphical layout/positioning. In other embodiments, "corresponds" is taken to mean closely matching in graphical detail and/or an internal graphical layout/positioning. In yet other embodiments, "corresponds" is taken to mean providing a full data model of a design, some aspects of which may be not shown depending on the context. For example, some aspects of the interactive design 102 may be shown to a user of the design tool 200 but may not be viewable by an end user of a prototype generated by the design tool 200.

The all-states view region 360 is a region of the design tool 200 in which a user can create, arrange, size, group, modify, style, inspect, and/or otherwise interact with multiple state views of a stateful widget container concurrently in a "what you see is what you get" manner such that graphical modifications made to a given stateful widget container in the all-states view region 360 closely or exactly match how the stateful widget container will appear in a prototype (e.g., full sized and/or fully functional). That is, whereas the canvas display region 204 of the design tool 200 exclusively shows a single state view of a stateful widget container, the all-states view region 360 shows all, or as based on user preference, a portion, of the state views of a stateful widget container concurrently and enables a user to perform full concurrent editing, modification, and/or creation of stateful widget containers and state views thereof.

By comparison, some conventional solutions depict a thumbnail view (i.e., lacking in graphical detail and/or) of all of the state views of a stateful widget container concurrently, but do not enable a user to perform full concurrent editing, modification, and/or creation of stateful widget containers and state views thereof. Rather, such conventional solutions may use a thumbnail view of all of the state views to enable a user to select a particular state view, but do not enable a user to edit internal aspects of a state view while in thumbnail view. Additionally, upon selection of a particular state view, such conventional solutions only enable a user to perform editing of a stateful widget container in accordance with a single state view at a time. For example, in a convention solution, though all state views of a stateful widget container are shown concurrently in a thumbnail view, modifications made to respective state views of the stateful widget container cannot be performed or observed concurrently by the user. Similarly, some conventional solutions depict a hierarchical tree view of all state views of a stateful widget container concurrently, but modifications made to a given state view of the stateful widget container are not performed in a "what you see is what you get" manner such that graphical modifications made to a given stateful widget container in the all-states view region 360 closely or exactly match how the stateful widget container will appear in a prototype.

Figure 3B:
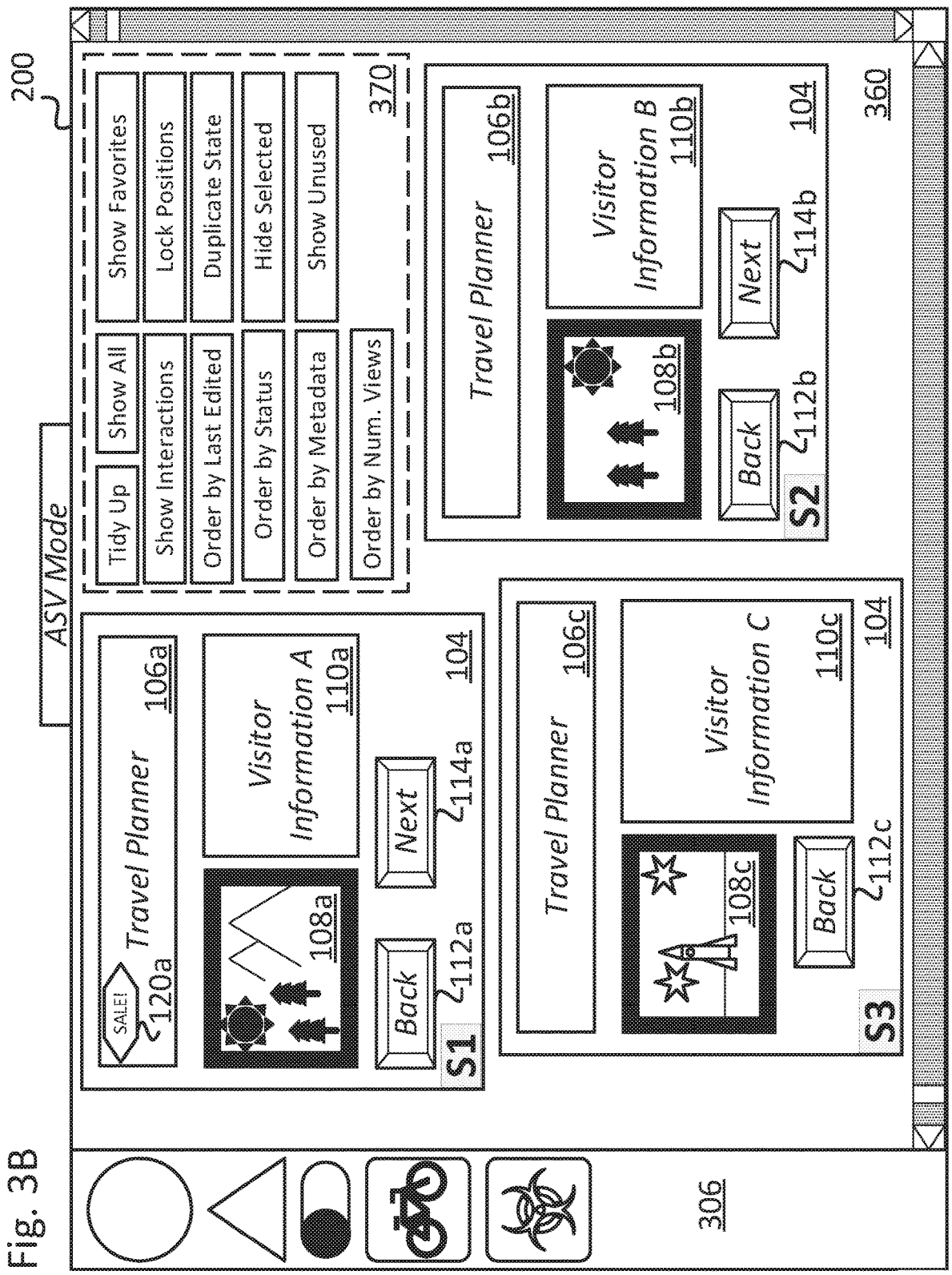

As shown in FIG. 3B, graphical positions of stateful widget containers and state views thereof within the all-states view region 360 can be selected and moved by a user in accordance with the user's needs and are not constrained to a row-column format and are further not constrained by a state view associated with the stateful widget containers. For example, in FIG. 3B, the second state view S2 of the first stateful widget container 104 is graphically positioned such that it is not graphically within a particular row or column and also is not within a particular state sequence of the stateful widget container 104. In some embodiments, such "free-form" graphical positioning of the state views may be useful to a user when making graphical updates to a design. In other embodiments, respective graphical positions of the state views may be more tightly constrained. For example, in some embodiments, graphical positioning of the state views is constrained to a layout, such as a grid. In such embodiments, if one or more of the state views is resized, the entire grid layout is resized accordingly.

Also shown in FIG. 3B are examples of selectable user actions 370 which may be part of the menu 306, may be pop-up menus or buttons, may be context-driven menus or buttons, may be associated with a "hot-key" (i.e., one, or a combination of, keyboard buttons), and/or may be selected by a combination of actions (e.g., pressing a button on a keyboard while selecting an element with a mouse cursor). The example selectable user actions 370 include, but are not limited to, the following: Tidy Up, Order by Last Edited, Order by Status, Order by Metadata, Order by Num. Views, Show All, Show Interactions, Show Favorites, Lock Positions, Duplicate State, Hide Selected, and Show Unused.

The Tidy Up action reorders a graphical position of the stateful widget containers and state views thereof displayed in the all-states view region 360 based on a previous, preferred, default, or user-selectable criteria (e.g., the Tidy Up action could occur whenever changes are made to one or more state views). Such criteria may be simply arranging the stateful widget container state views graphically in a row-column order (e.g., returning to a tightly-constrained grid-layout) or arranging the stateful widget container state views by associated state view (i.e., S1, S2, S3). The Order by Last Edited action reorders a graphical position of the stateful widget container state views displayed in the all-states view region 360 based on when each of the stateful widget container state views was edited at a given workstation, by a given user, at a set of workstations, or by a set of users. The Order by Status action reorders a graphical position of the stateful widget container state views displayed in the all-states view region 360 based on a current status of each of the stateful widget container state views (e.g., a favorite status, a hidden status, an unused status, a most-used status, or other). The Order by Metadata action reorders a graphical position of the stateful widget container state views displayed in the all-states view region 360 based on metadata associated with each of the stateful widget container state views (e.g., a dimension, a creator, a property, a version, style information, a CSS property, associated JAVASCRIPT code, or other). The Order by Num. Views action reorders a graphical position of the stateful widget container state views displayed in the all-states view region 360 based on how often each state view of the stateful widget container is viewed by a user of a prototype by the design tool 200. In some embodiments, the selectable user actions 370 additionally include filtering actions (not shown) that enable a user to control which state views are shown, hidden, and/or control an ordering thereof, based on user criteria (e.g., sort by new, sort by old, sort by most used, hide unused, etc.).

The Show All action shows all state views of a stateful widget container, regardless of whether a particular state view of the stateful widget container has been selected by a user to be hidden. The Show Interactions action shows inter- and intra-stateful widget container state view interactions associated with interactive widgets contained within the stateful widget container, and associated with interactive widgets that are not contained within the stateful widget container (i.e., interactive widgets of the interactive design 102). The Show Favorites action shows state views of the stateful widget container that have been indicated by a user, or based on a system setting, to be a "favorite" state view (for example, state views that have been flagged for review, a state views that is currently being modified, or other).

The Lock Positions action may either force a graphical position of each state view of the stateful widget containers in the all-states view region 360 to remain fixed in a row, column, or row-column graphical arrangement, force each state view of the stateful widget containers to remain fixed in the graphical position they were in when the Lock Positions action was selected, or prevent a state view of each stateful widget container from changing based on a graphical position of the state views of the stateful widget containers. The Duplicate State action duplicates one or more selected state views of the stateful widget container. In some embodiments, when a state view is duplicated, all interactive widgets contained within the selected state view are duplicated in a new state view of the stateful widget container. In other embodiments, when a state view is duplicated, only selected interactive widgets contained within the selected state view are duplicated in a new state view of the stateful widget container. The Hide Selected hides any selected state views of the stateful widget containers (which may be shown again when the Show All action is triggered). The Show Unused action triggers a display within the all-states view region 360 of which state views of the multiple stateful widgets are not used in the interactive design 102.

In addition to enabling a user to arbitrarily move graphical positions of state views of stateful widget containers within the all-states view region 360, in some embodiments, a user may selectively (e.g., when pressing a hot-key or selecting a menu option) change state views associated with a stateful widget container based on a graphical position of the state views of that stateful widget container in the all-states view region 360.

Figure 3C:
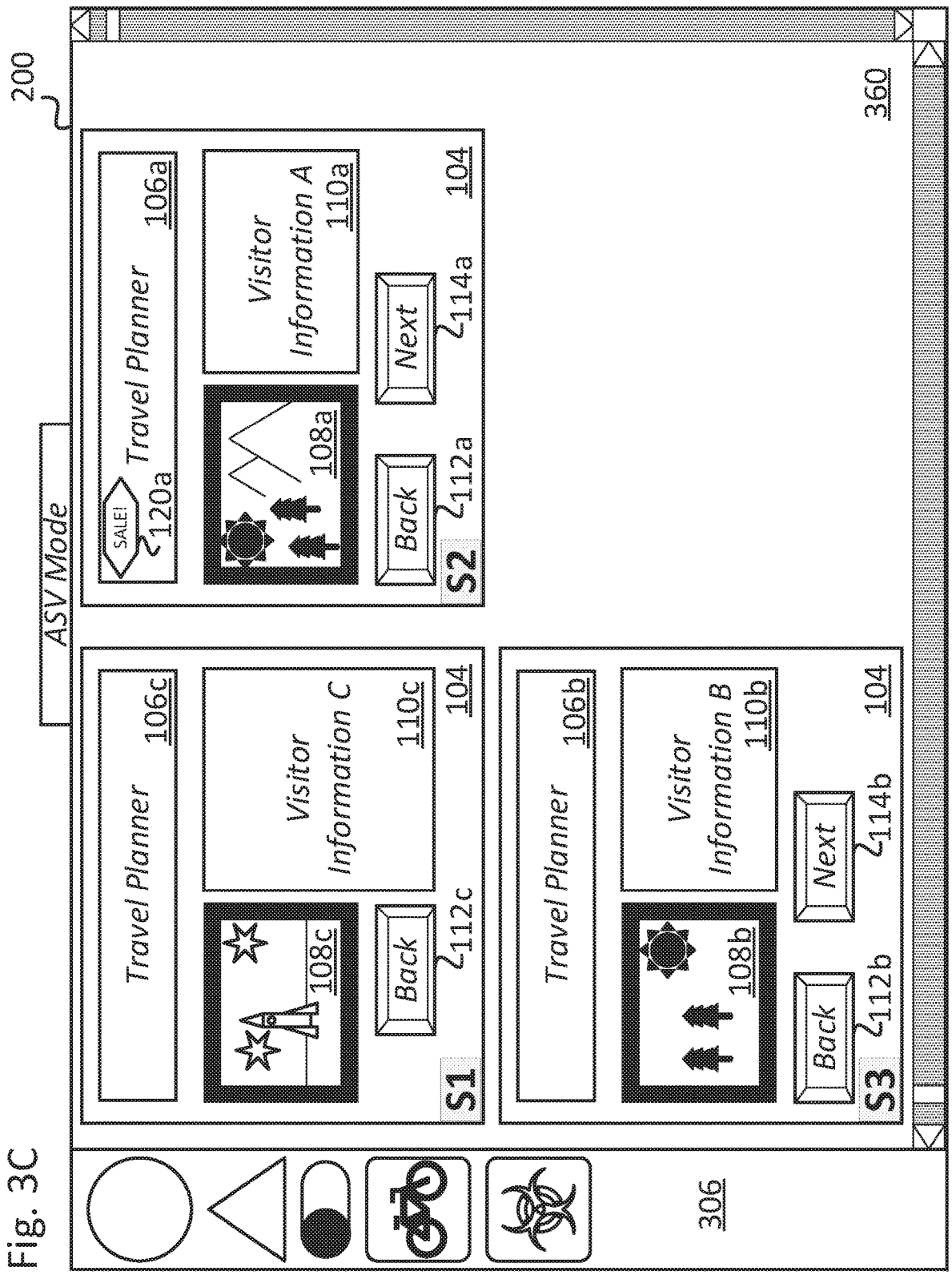

For example, as shown in FIG. 3A, state view S1 is associated with interactive widget 108*a* (among others), state view S2 is associated with interactive widget 108*b* (among others), and state view S3 is associated with interactive widget 108*c* (among others). Turning attention to FIG. 3C, based on a graphical position of the state views S1-S3 of the stateful widget container 104, state view S1 is now associated with interactive widget 108*c* (among others), state view S2 is now associated with interactive widget 108*a* (among others), and state view S3 is now associated with interactive widget 108*b* (among others).

As compared to conventional solutions which prohibit a user from editing more than one state view of a stateful widget container at a time, stateful container management as disclosed herein advantageously enables a user to edit multiple state views of multiple stateful widget containers simultaneously. When editing stateful widget containers in the all-states view design context, interactive widgets can be moved between state views (i.e., "cut and pasted" or "dragged"), duplicated between state views (i.e., "copy and pasted"), added from an interactive widget library (e.g., from the menus 306), added from a state view of another stateful widget container, added from the canvas display region 204, and/or drawn or created by a user (e.g., using drawing tools and/or geometric primitives). Additionally, interactive widgets can be added, removed, styled, or edited in all state views, or in a selected subset of state views, of a stateful widget container simultaneously.

Figure 3D:
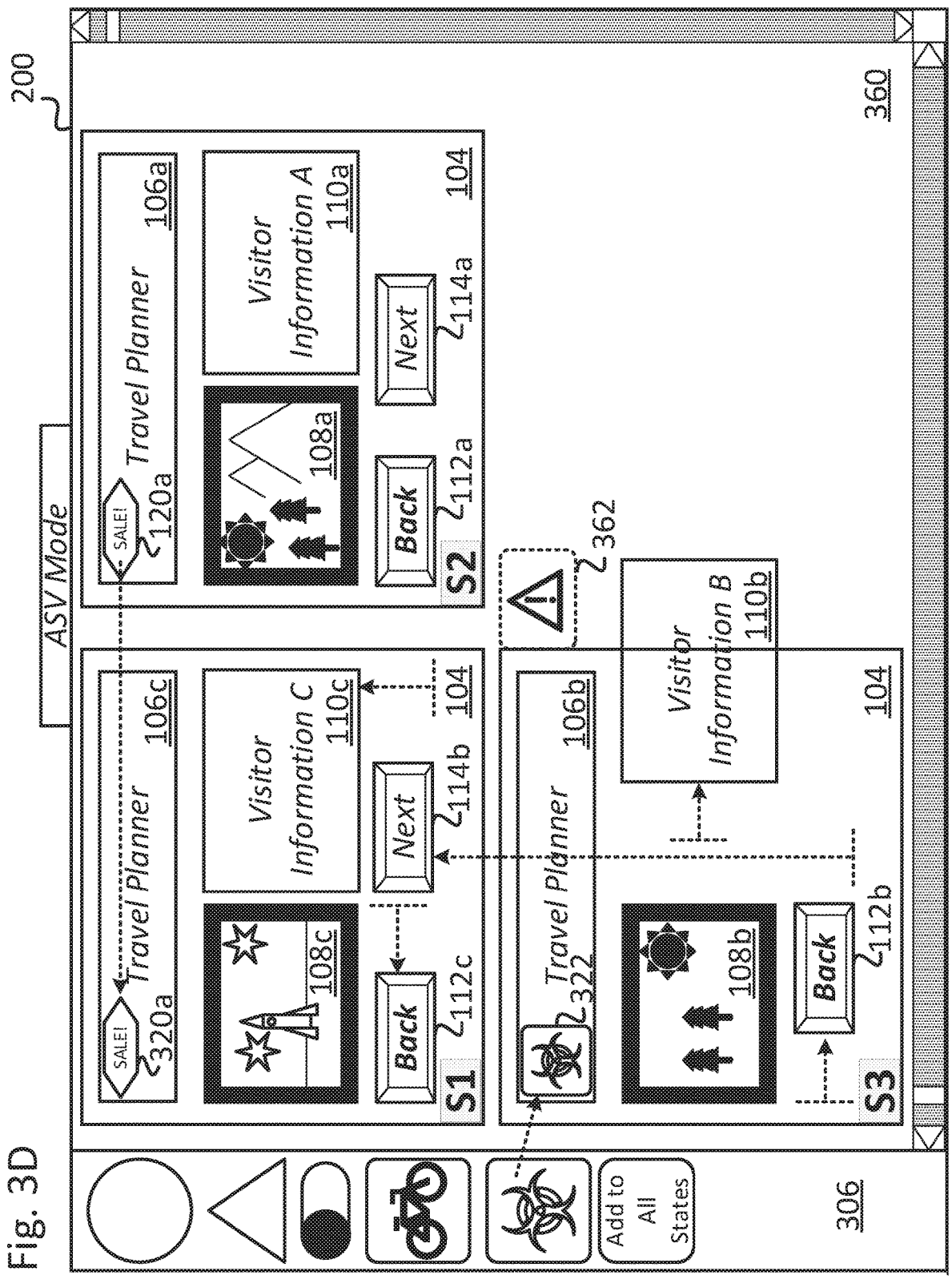

In the example shown in FIG. 3D, while viewed in the all-states view region 360 when the design tool 200 is in the all-states view design context, multiple interactive widgets of the stateful widget container 104 can be modified by a user, as represented in FIG. 3D by dashed lines. In some embodiments, modifications made to the stateful widget container 104 are performed in a "what you see is what you get" manner, thereby advantageously immediately illustrating to a user how the stateful widget container 104 will appear within a prototype generated by the design tool 200. Thus, the design tool 200 advantageously enables a user to provide user input to one or more interactive widgets of one or more state views of a stateful widget container while other state views of the stateful widget container are being concurrently displayed. The user input can also, or instead, be received at a state view itself (e.g., to adjust a graphical or interactive property of the state view or the stateful widget container). The user input could modify a parameter, style, position, metadata, or other aspect of the interactive widget or state view. Additionally, such user input could trigger an interaction associated with the interactive widget or state view. As shown, the next button interactive widget 114*b* has been moved from the state view S3 of the stateful widget container 104 to the state view S1 of the stateful widget container 104. A vertical extent of the text display interactive widget 110*c* of the state view S1 has been shortened. An interactive widget 322 has been added to the state view S3 from an interactive widget library of the menus 306 (or from the canvas 204). Text of the back button interactive widgets 112*a* through 112*c* has been bolded simultaneously by the user (e.g., by selecting each of the interactive widgets 112*a* through 112*c* using a keyboard and mouse cursor combination and then modifying the parameter). The back button interactive widget 112*a* of the state view S3 has been moved slightly to the right. The text display interactive widget 110*b* of the state view S3 has been moved slightly to the right such that a portion of the text display interactive widget 110b is outside of an outer perimeter of the state view S3. The back button interactive widget 112c of the state view S1 has been moved slightly to the left, and a text display interactive widget 120a of the state view S2 has been duplicated as a text display interactive widget 320a in the state view S1. In some embodiments, an indication, such as a warning icon 362, is displayed in the all-states view region 360 to alert a user that all or a portion of one or more interactive widgets are outside an output perimeter (i.e., a graphical boundary) of an associated state view (e.g., the interactive widget 110b of the state view S3). Additionally, multiple interactive widgets across multiple state views of a stateful widget container may be selected and modified concurrently. For example, any combination of the interactive widgets 108a through 108c could be selected and/or modified concurrently in the all-state view region 360.

Figure 3E:
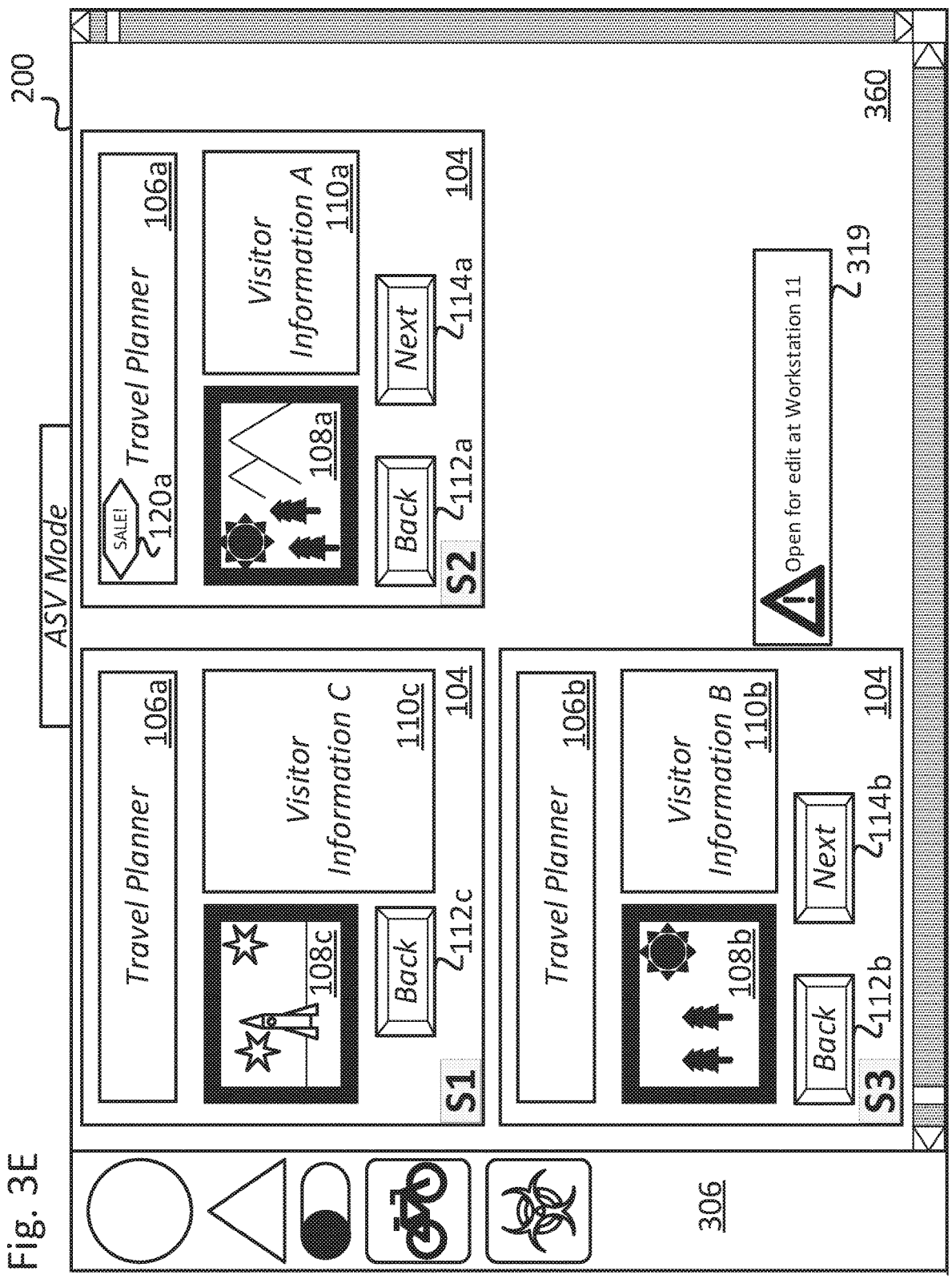

Additionally, as shown in FIG. 3E, in some embodiments, an indication, such as an indicator 319, is displayed in the design tool 200 to convey which state views of a stateful widget container are being concurrently edited by other users of the design tool 200. In some embodiments, edits made by a first user of the design tool 200 at a first workstation appear in real-time, or near real-time, at the design tool 200 at a second workstation.

In some embodiments, interactions between interactive widgets within a particular state view or between state views of a stateful widget container are represented graphically in the all-states view region 360. Additionally, in some embodiments, interactions between interactive widgets of a state view of a first stateful widget container and interactive widgets of a state view of a second stateful widget container are represented graphically in the all-states view region 360. Still additionally, in some embodiments, interactions between interactive widgets of stateful widget containers and interactive widgets that are not contained by a stateful widget container are represented graphically in the all-states view region 360. Interactions between interactive widgets include events that are triggered or emitted by interactive widgets, state transitions that are triggered or emitted by interactive widgets, event handlers of interactive widgets, or other functionality of an interactive design which is dynamic and controllable by either user input or system events.

Figure 4:
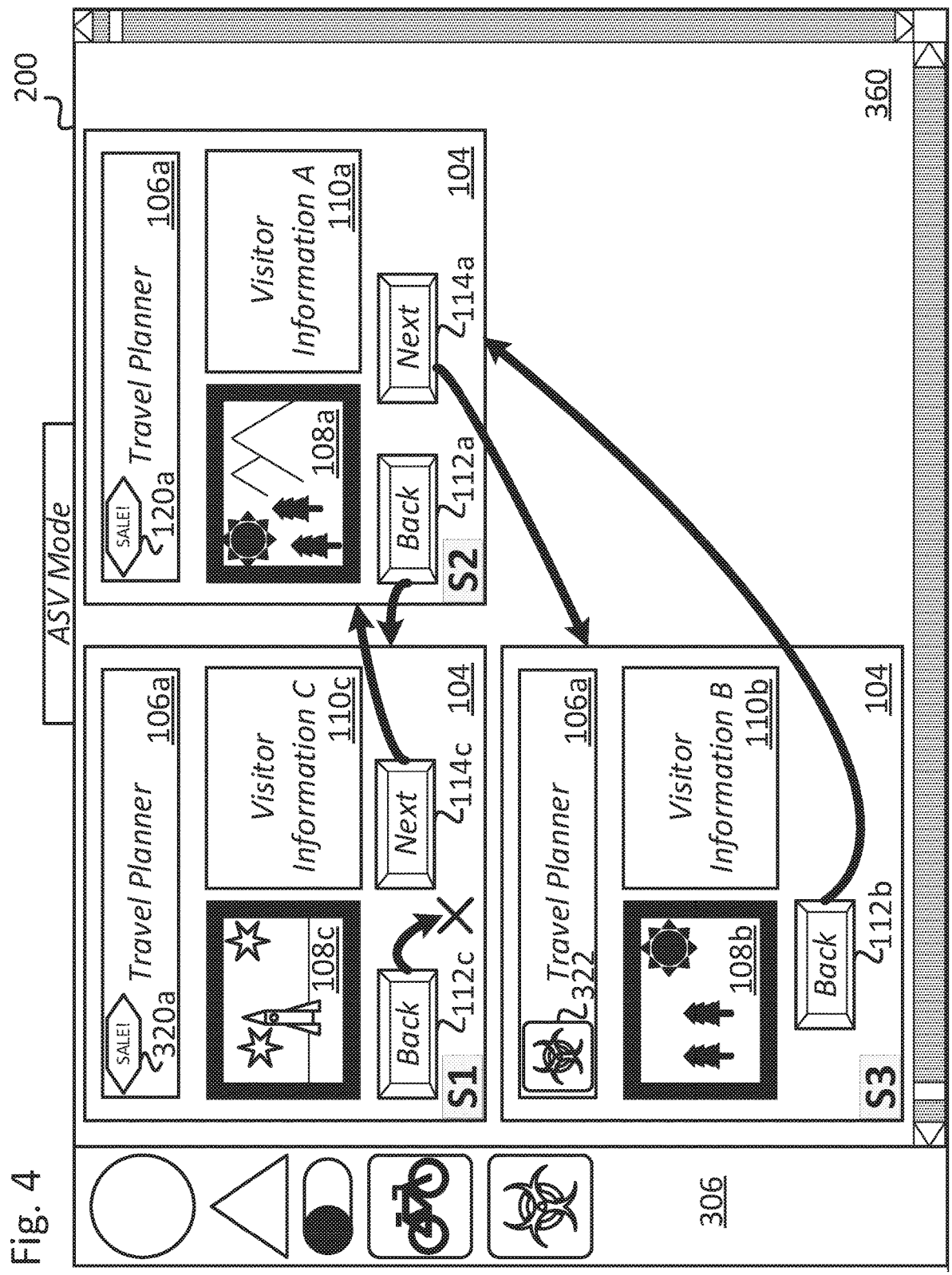
FIG. 4 illustrates simplified examples of an all-states view design context of the design tool shown in FIG. 2, in accordance with some embodiments.

In an example shown in FIG. 4, interactions between interactive widgets of the stateful widget container 104 are illustrated to a user of the design tool 200 by thick black arrows (for example). As shown, the next button interactive widget 114c of the state view S1 triggers a state transition of the stateful widget container 104 to transition from state view S1 to state view S2. The next button interactive widget 114a of the state view S2 triggers a state transition from state view S2 to state view S3. The back button interactive widget 112b of state view S3 triggers a state transition from state S3 to state view S2. The back button interactive widget 112a of state view S2 triggers a state transition from state view S2 to state view S1. The back button interactive widget 112c of state view S1 triggers an undefined or invalid interaction, as illustrated to a user of the design tool 200 by an X icon. Interactions on, and between, state views of a stateful widget container, or between state views of different stateful widget containers, may also be shown and/or triggered.

Figure 8:
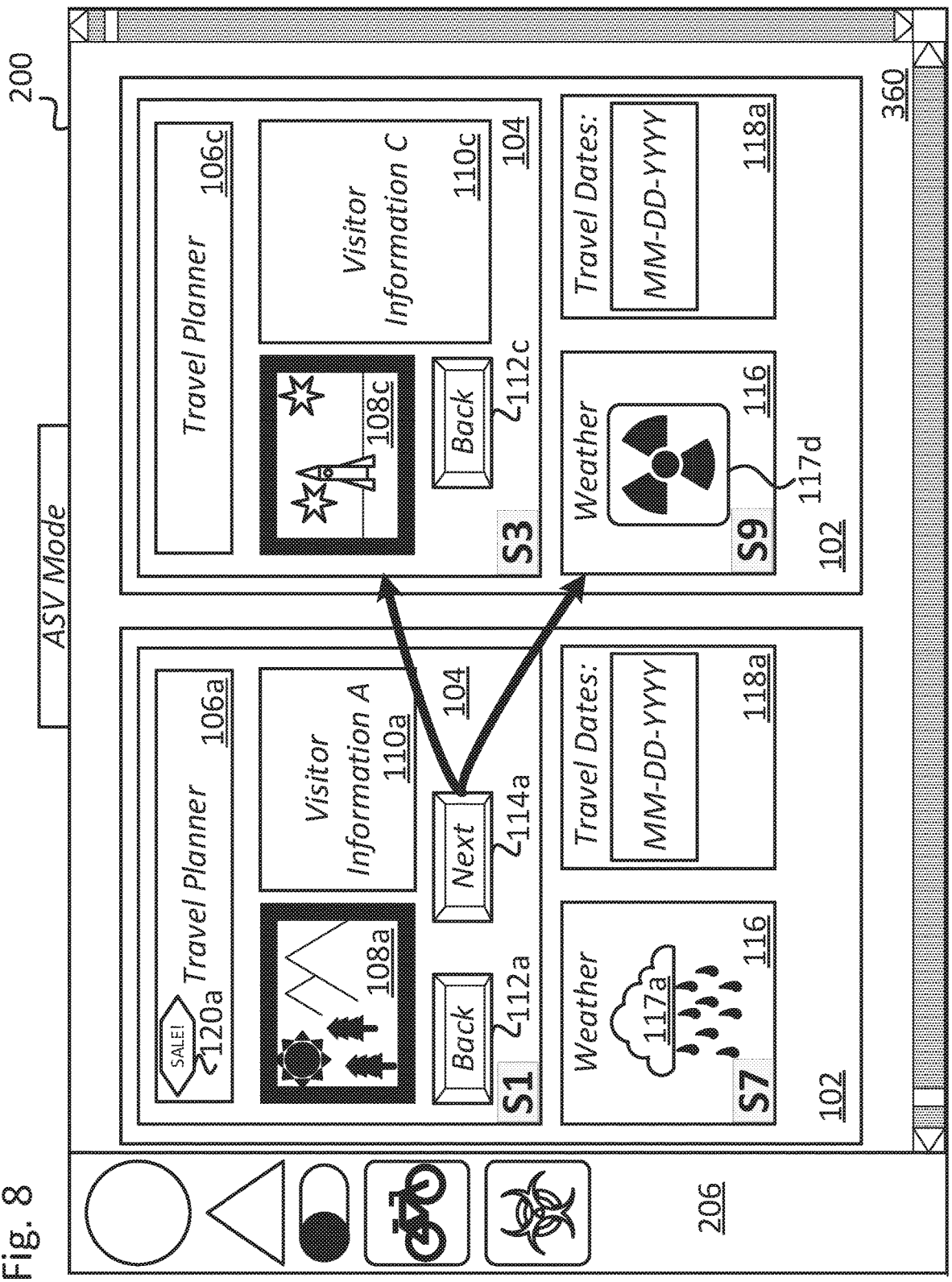
FIG. 8 illustrates simplified examples of an all-states view design context of the design tool shown in FIG. 2, in accordance with some embodiments.

In addition to representing interactions as illustrated in FIG. 4, a user of the design tool 200 when in all-states view design context may trigger actual interactions between interactive widgets of stateful widget containers, or between interactive widgets of stateful widget containers and interactive widgets that are not contained within stateful widget containers. Such features are described below with respect to FIG. 8. Additionally, interactions shown within the all-states view region 360 may be adjusted visually by a user. For example, a user could drag the black arrow attached to the back button interactive widget 112c so that it graphically connects to state view S3 of the stateful widget container 104, thereby triggering a state transition from state view S1 to state view S3 when the back button interactive widget 112c is selected by a user. Still additionally, when building a conditional logic statement for an interaction, a user may visually choose which state view, or interactive widget within a specific state view, will invoke the condition or be used in the condition's logic.

Figure 5A:
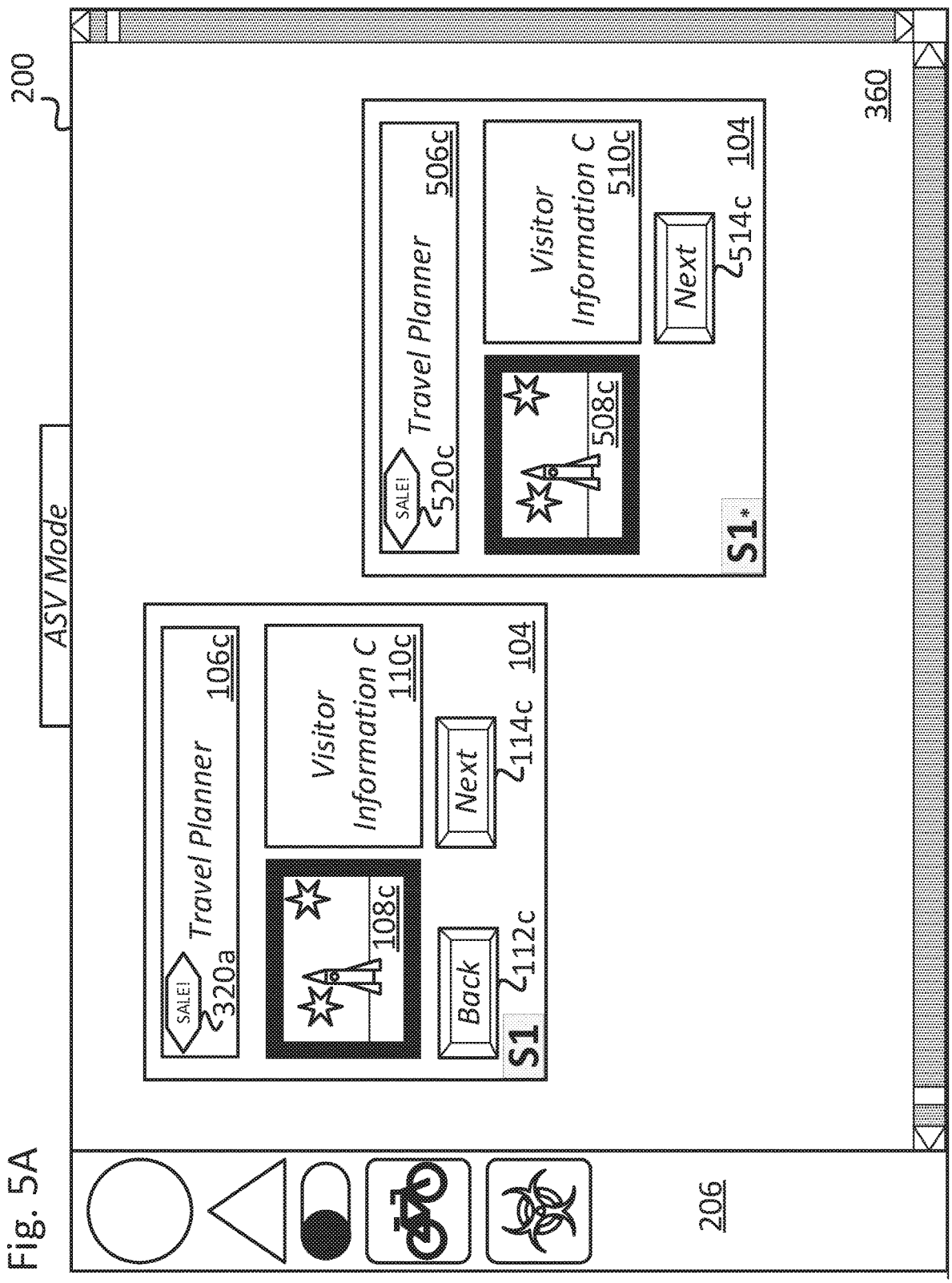
FIG. 5A through FIG. 5C illustrate simplified examples of an all-states view design context of the design tool shown in FIG. 2, in accordance with some embodiments.
Figure 5B:
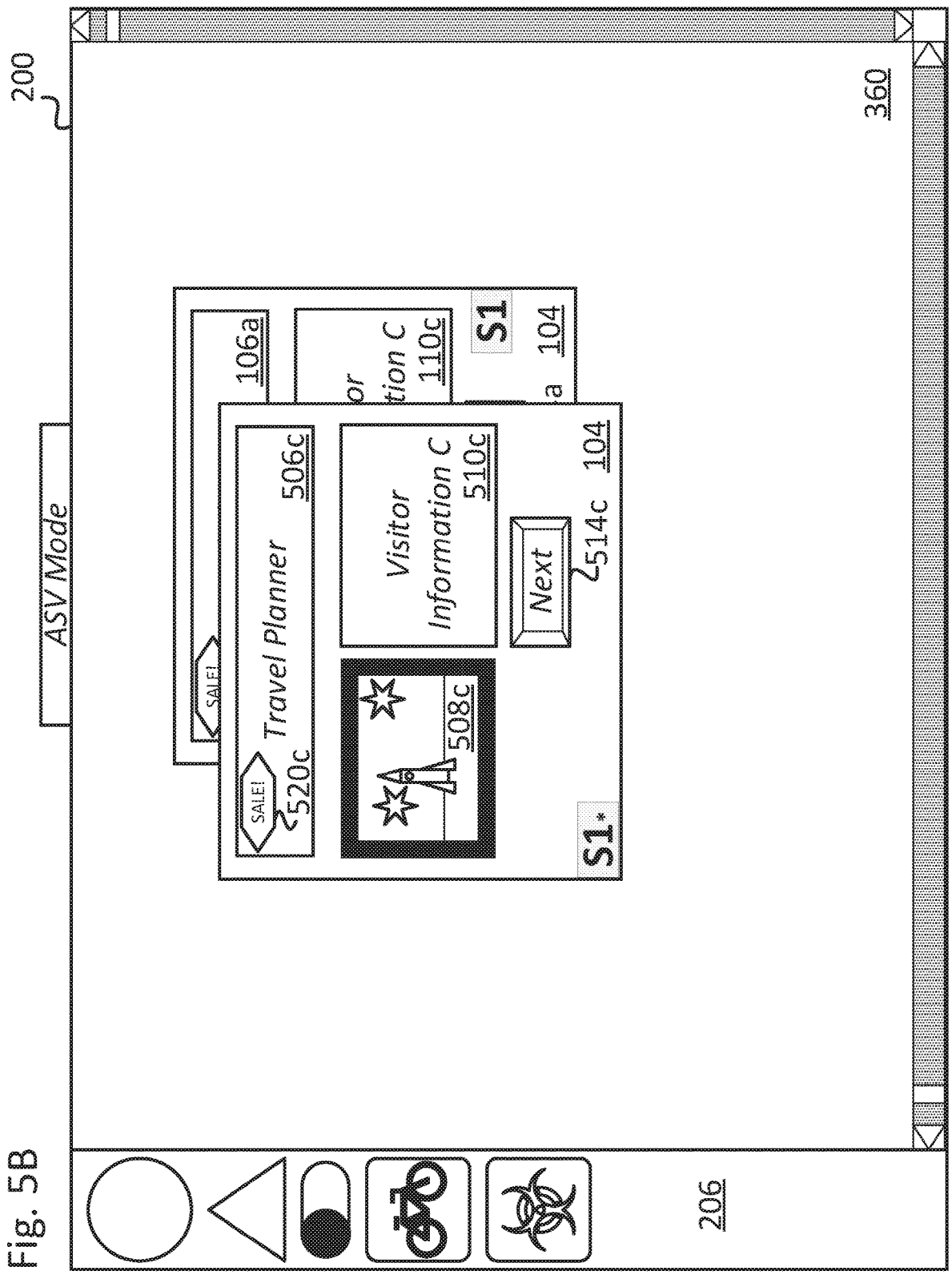
Figure 5C:
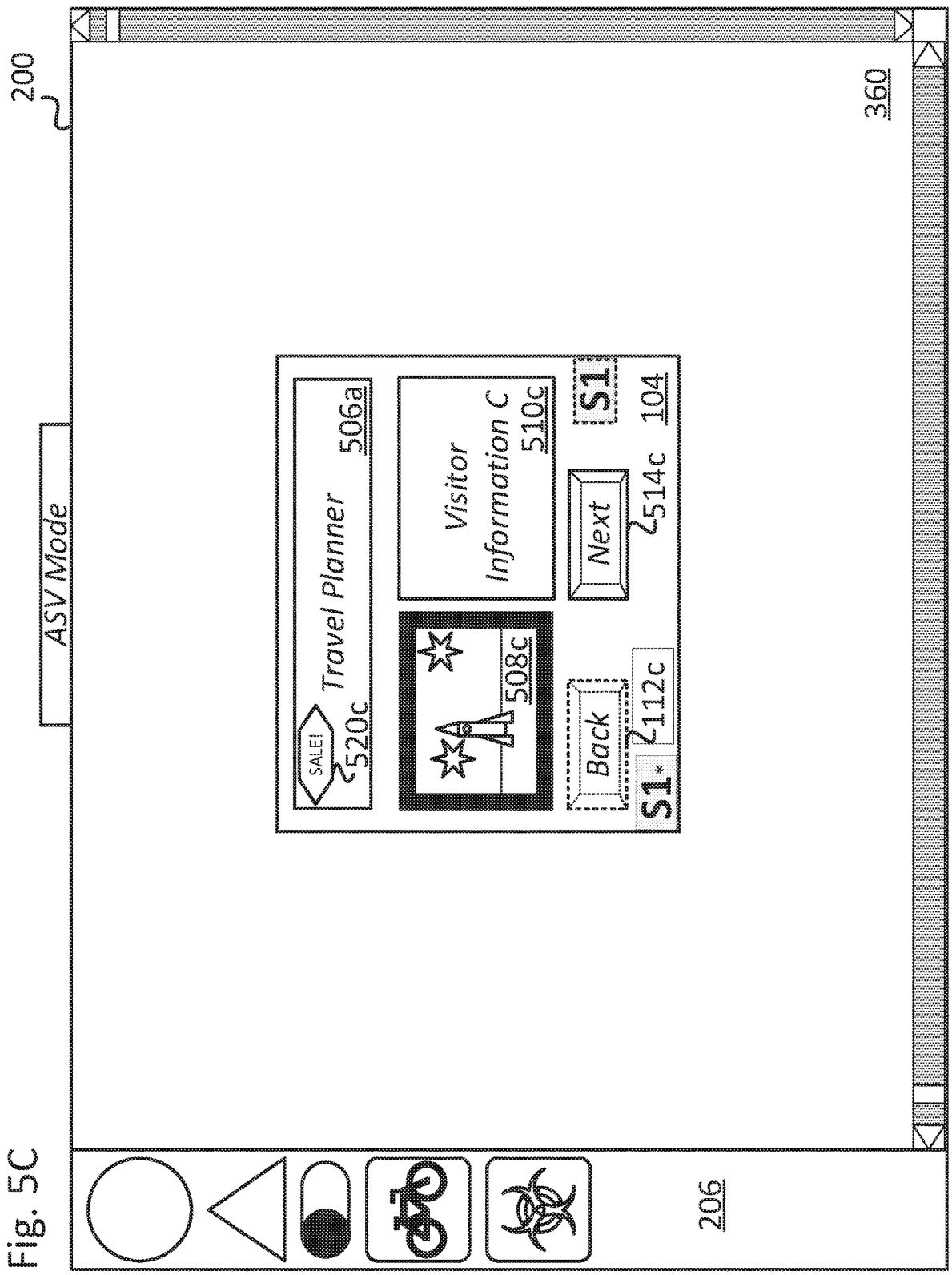

Stateful widget container management, as disclosed herein, also advantageously enables a user to quickly determine changes made to state views of a stateful widget container by enabling a user to arrange state views of a stateful widget container in a "three dimensional" or "layered" view. For example, FIG. 5A shows two state views S1 and S1* of the stateful widget container 104, state view S1* including interactive widgets 506c, 508c, 510c, 514c, and 520c. As shown, the state view S1 and S1* are identical with the exception that the back button interactive widget 112c has been removed from the state view S1*. FIG. 5B shows an intermediate step of a user graphically moving state view S1* such that it partially graphically overlaps state view S1. In FIG. 5C, state view S1* fully overlaps state view S1. Accordingly, a graphical difference between state view S1* and state view S1 is shown in the all-states view region 360. In the example shown, the back button interactive widget 112c is rendered using a dashed line to indicate to a user that the interactive widget 112c has been deleted. In other embodiments, an opacity of whichever state view is graphically on top of the other state view is adjusted (e.g., 20%, 50%, or by another value) such that the state view graphically under the top state view is partially displayed. In some embodiments more than two state views of a stateful widget container may be graphically layered on top of each other to illustrate graphical differences. In some embodiments, the design tool 200 may automatically "flip" between the layered state views to further illustrate graphical differences therebetween. In some embodiments state views of different stateful widget containers may also be graphically layered on top of each other to illustrate graphical differences. In some embodiments, a previous version of a state view of a stateful widget container, retrieved by the design tool 200 from a revision control system, is automatically layered on top of a current version of the state view of the stateful widget container to illustrate graphical differences.

Figure 6:
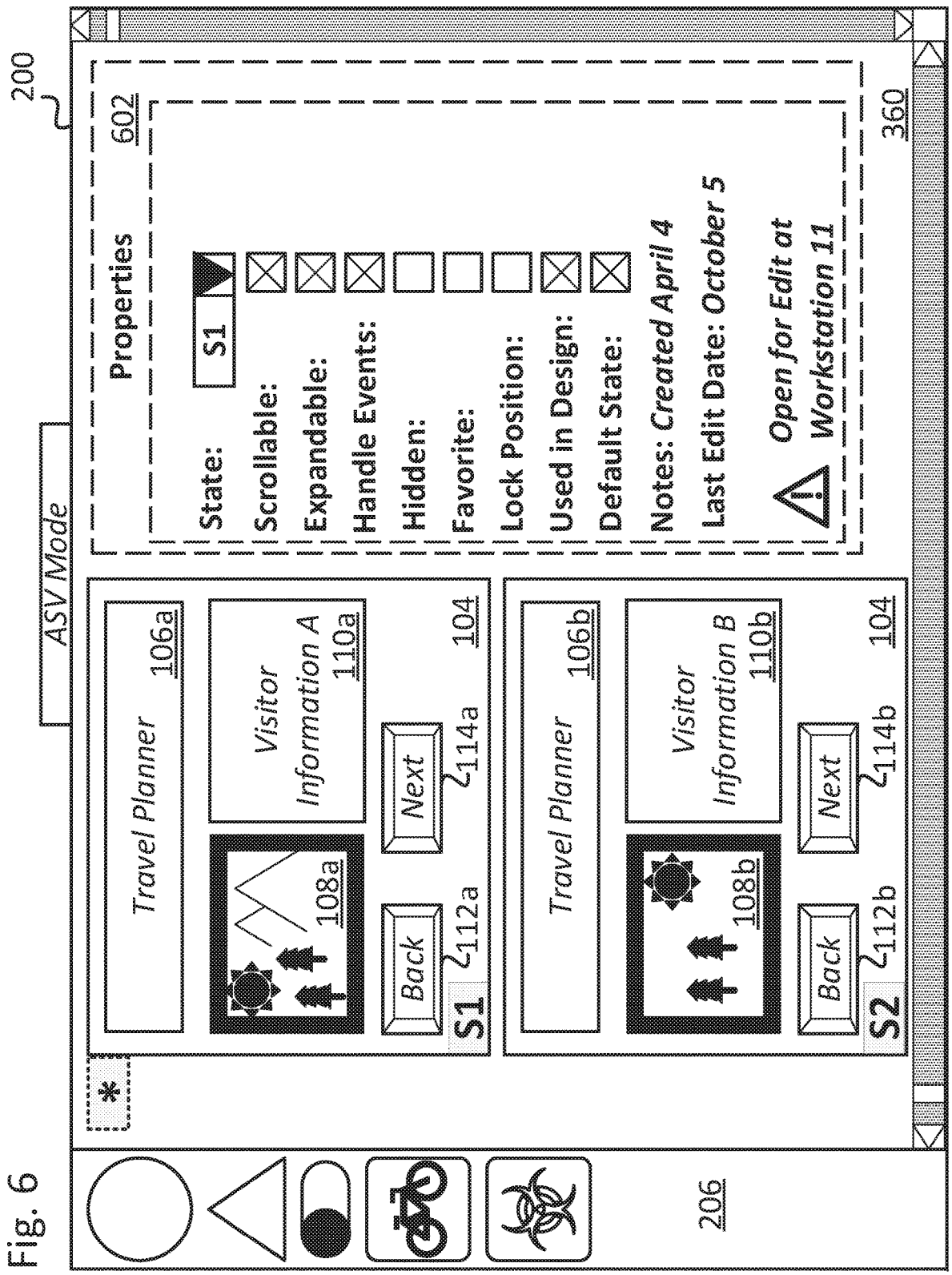
FIG. 6 illustrates simplified examples of an all-states view design context of the design tool shown in FIG. 2, in accordance with some embodiments.

In addition to displaying graphical aspects of state views of stateful widget containers within the all-states view design context of the design tool 200, properties and metadata associated with state views, stateful widget containers, and or interactive widgets of the stateful widget containers may be displayed, inspected, and modified in the all-states view design context of the design tool 200. For example, in FIG. 6, a graphical interface 602 associated with both state view S1 and the stateful widget container 104 is displayed. The graphical interface 602 may be a single menu, multiple menus, or a menu hierarchy. Additionally, the graphical interface 602 may be context sensitive. The graphical interface 602 enables a user to view, modify, and/or interactively inspect parameters corresponding to a state view (e.g., S1) and to the stateful widget container 104 independently. For example, some parameters modified by a user using the graphical interface 602 may apply to state-centric behavior of the stateful widget container 104, while other parameters may apply to graphical, event, or interactive properties of the stateful widget container 104 itself. As shown, the graphical interface 602 enables a user to associate a particular state with the state view selected, specify whether a particular state view is scrollable, expandable (i.e., an expansion property), or otherwise graphically adjustable, specify interactivity (e.g., events or event handlers) of a state view and/or of the stateful widget container, specify whether a particular state view is hidden, specify whether a particular state view is a favorite state view, specify whether a graphical position of a particular state view should be locked (i.e., not changeable by the user), whether a particular state view is, or is to be, used in a design, whether a particular state view is a default state view (also indicated by an '*' icon attached to the state view S1), determine when a particular state view and/or stateful widget container was created, specify or display a user determined note, determine when a particular state view and/or stateful widget container was last edited, and determine if and where a particular state view and/or stateful widget container is currently being edited. In some embodiments, a property, a setting, styling information (e.g., a background color), and/or metadata may be propagated to all, or a subset, of the state views of a stateful widget container in the all-states view design context of the design tool 200.

Figure 7:
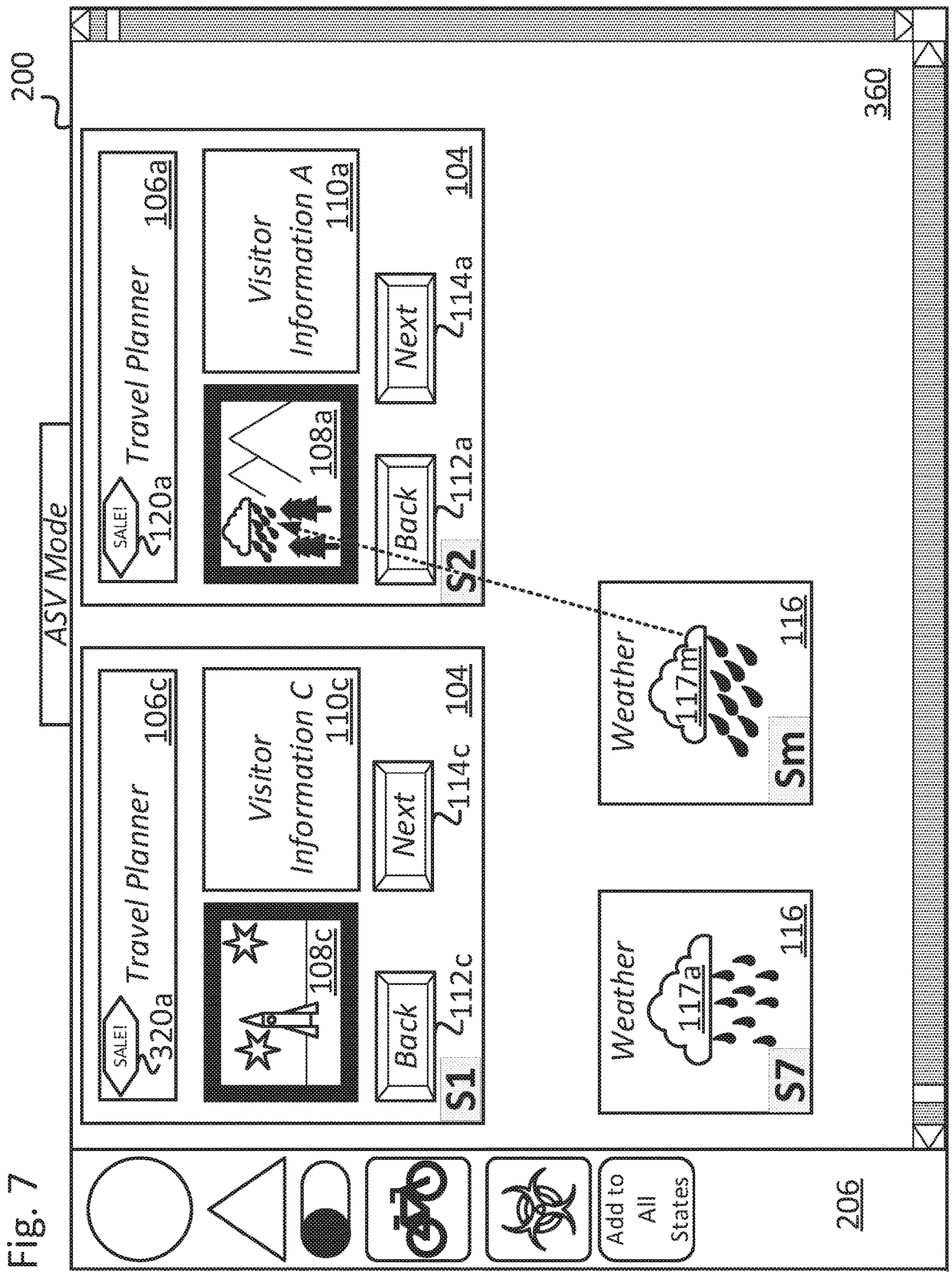
FIG. 7 illustrates simplified examples of an all-states view design context of the design tool shown in FIG. 2, in accordance with some embodiments.

In addition to displaying and enabling a user to edit multiple state views of a single stateful widget container concurrently in the all-states view design context of the design tool 200, the design tool 200 also enables a user to edit multiple state views of multiple stateful widget containers concurrently in the all-states view design context of the design tool 200. As shown in FIG. 7, state view S1 and S2 of the first stateful widget container 104 are displayed concurrently in the all-states view region 360 with state views S7 and Sm of the second stateful widget container 116. As shown, interactive widget 117m of state view Sm of the second stateful widget container 116 has been duplicated (i.e., copy and pasted) to the interactive widget 108a of state view S2 of the first stateful widget container 104 from the second stateful widget container 116, as indicated by a dashed line. Other interactive widgets of the state views S1, S2, S7, and Sm may be moved, duplicated, styled or otherwise edited and modified between any of the state views S1, S2, S7 and Sm within the all-states view region 360.

Additionally, the all-states view region 360 is operable to display all or a portion of the interactive widgets that surround state views of stateful widget containers for multiple state views of the stateful widget containers concurrently. The all-states view region 360 is operable to display representations of interactions between any of the interactive widgets displayed within the all-states view region 360, or even enable a user to trigger actual interactions between any of the interactive widgets displayed with the all-states view region 360. In a simplified example shown in FIG. 8, multiple views of the interactive design 102 associated with state view S1 and state view S3 of the stateful widget container 104 are displayed concurrently in the all-states view region 360 of the design tool 200. In the example shown, a heavy black arrow indicates to a user of the design tool 200 that clicking the next button interactive widget 114a of the state view S1 of the stateful widget container 104 will trigger a state transition of the first stateful widget container 104 to state view S3 of the stateful widget container 104 and trigger a state transition of the second stateful widget container 116 to state view S9 of the second stateful widget container 116. In the state view S9 of the second stateful widget container 116, a weather icon 117d is displayed instead of the weather icon 117a. In some embodiments, multiple "pages" (e.g., a home or main page, a sub-page, etc.), of the interactive design 102 may be shown simultaneously in the all-states view design context, each page showing a corresponding state view, or version of a state view, of a stateful widget container. In some embodiments, the same page of the interactive design 102 is shown multiple times in the all-states view design context, simultaneously, to enable a user to view the same page in accordance with multiple states of a stateful widget container.

Figure 9A:
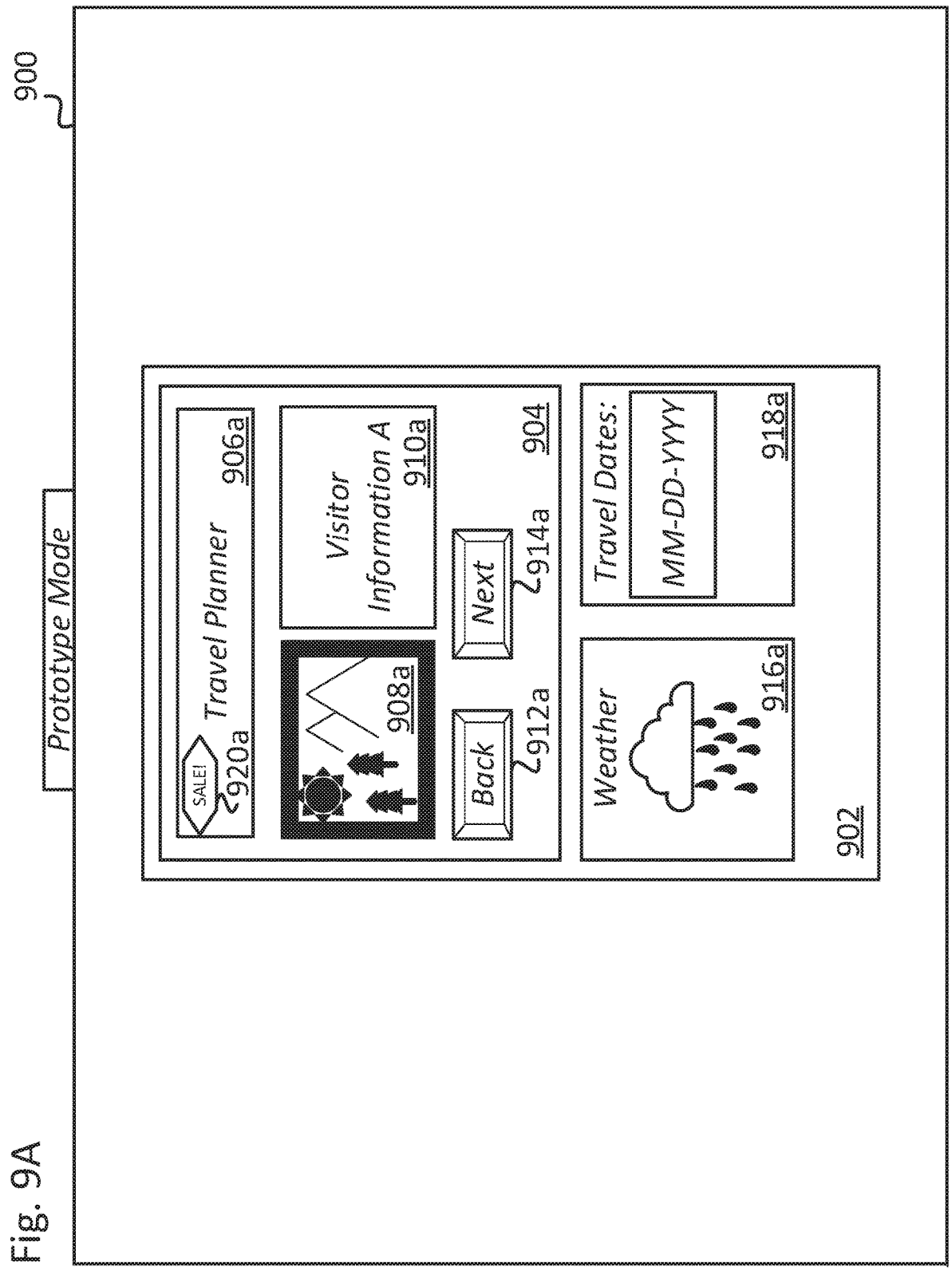
FIG. 9A through FIG. 9D illustrate simplified examples of a prototype view of an interactive graphical design, in accordance with some embodiments.
Figure 9B:
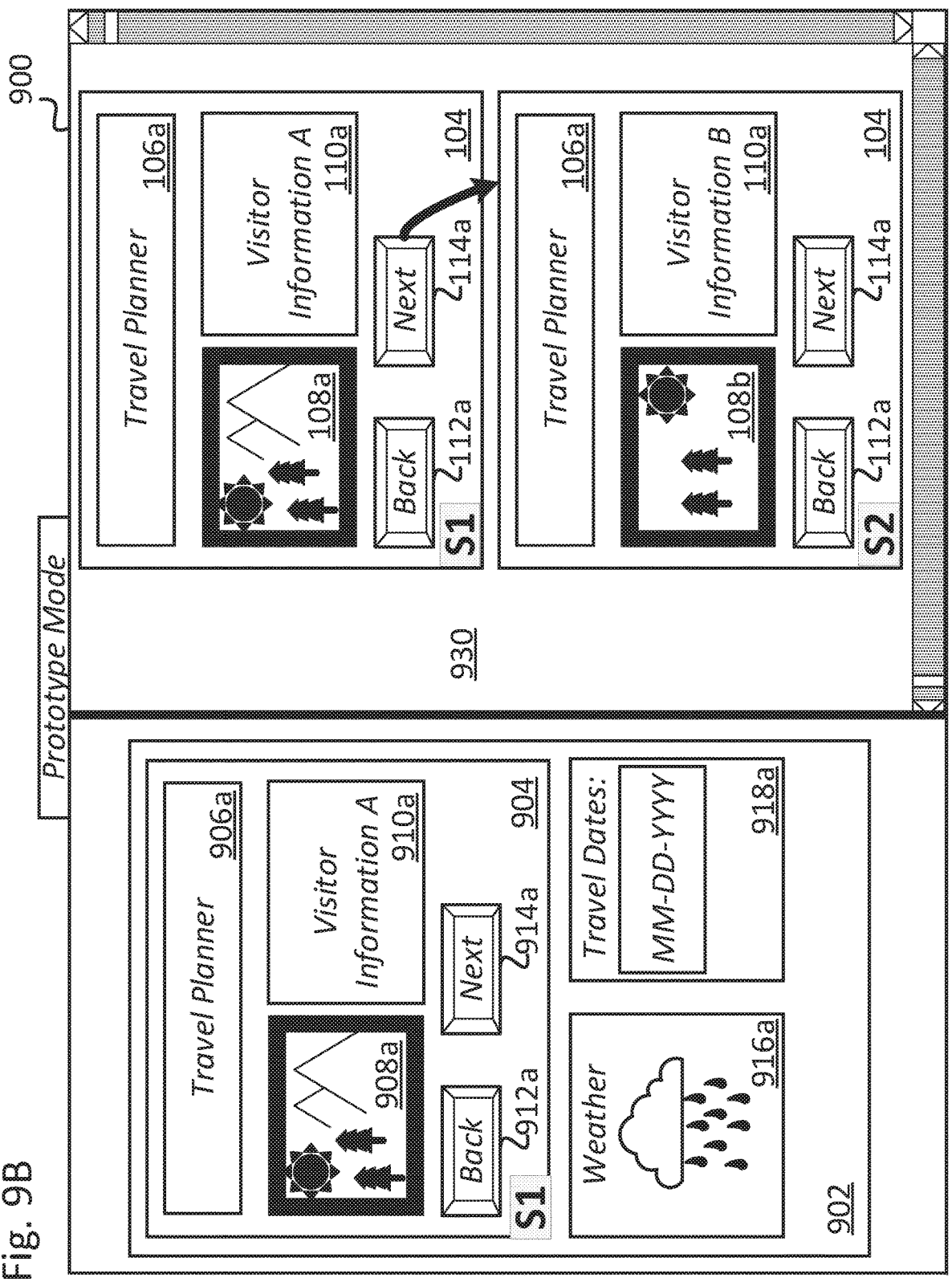
Figure 9C:
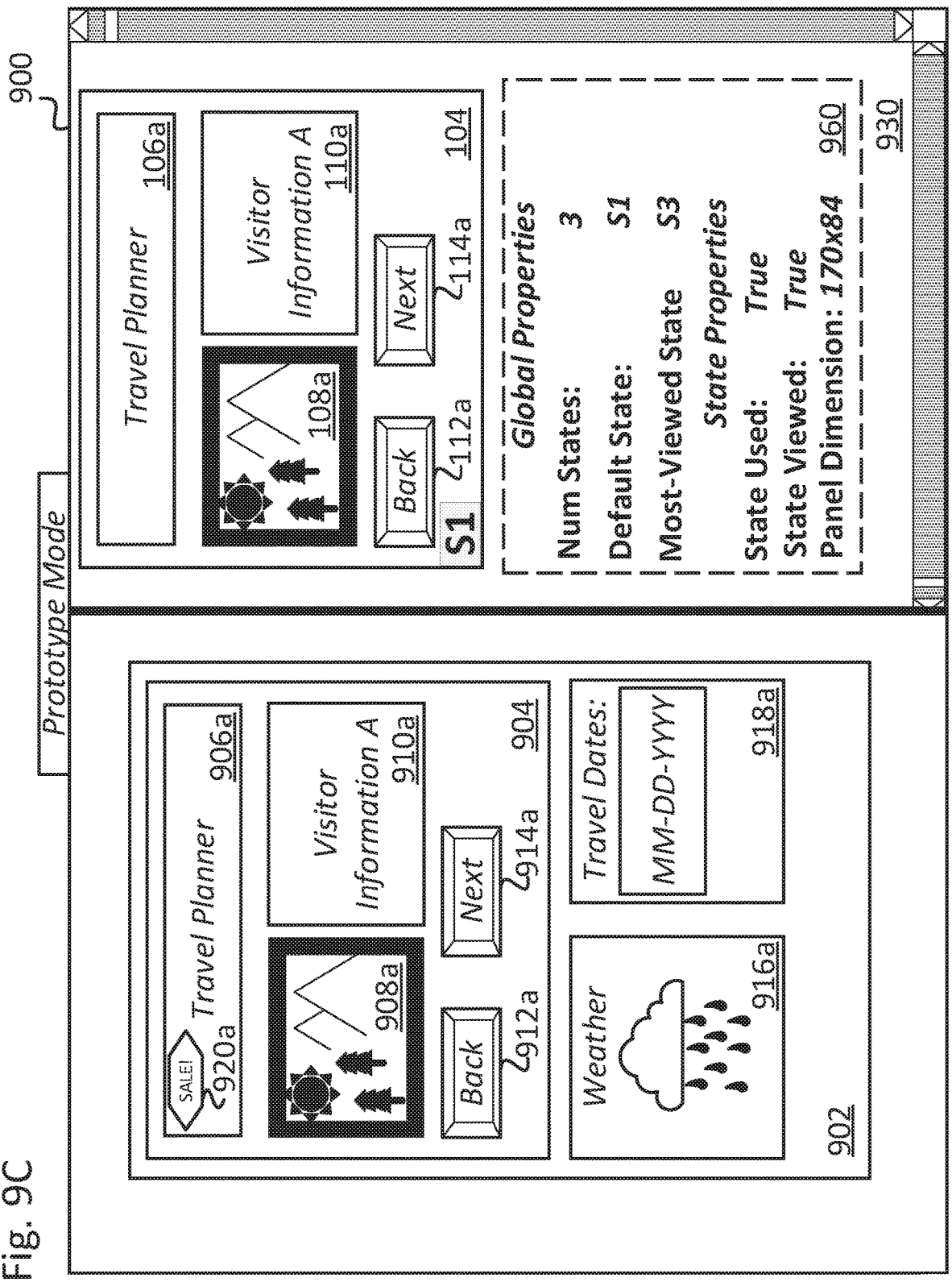

The design tool 200 is operable to generate, or export, a prototype or specification that can be viewed or rendered as a webpage in an external player, such as a web browser, as a software application on a desktop or laptop computer, or as a mobile application on a mobile platform such as a smart phone. FIG. 9A illustrates a simplified example of a prototype mode view of a prototype 902 of the interactive design 102 in a prototype view context 900. The prototype 902 includes interactive widgets 904, 906a, 908a, 910a, 912a, 914a, 916a, 918a, and 920a which correspond to the interactive widgets 104, 106a, 108a, 110a, 112a, 114a, 116, 118a, and 120a of the interactive design 102, respectively. Similar to behavior described with respect to the canvas display context, the prototype view context 900 exclusively shows only a single state view of a stateful widget container at a time. As shown in FIG. 9B, multiple state views of multiple stateful widget containers may be displayed concurrently in an all-states view prototype context, on demand, in an all-states view prototype context region 930 of the prototype view context 900 to facilitate debugging, review, and change tracking of the interactive design 102 even after it has been displayed as the prototype 902, as well as to show interactions associated with the stateful widget containers. For example, a thick black arrow illustrates to a user that input selecting the next button 114a/914a will transition the stateful widget container 104/904 from state view S1 to state view S2. Additionally, as shown in FIG. 9C, metadata and other properties 960 associated with multiple state views of multiple stateful widget containers may be displayed and inspected within the prototype context region 930. In the example shown FIG. 9C, such metadata and other properties 960 include, but are not limited to, global properties (i.e., properties that relate to all state views of a stateful widget container) such as the number of state views, the default state view, and which state view has been viewed the most in the prototype 902. The metadata and other properties 960 also include, but are not limited to, state properties (i.e., properties that relate to particular state views of the stateful widget container) such as whether a particular state-view is used in the prototype 902, whether a particular state-view has ever been viewed (i.e., displayed) in the prototype 902, and graphical dimensions of the stateful widget container. Other data displayed could include styling data (e.g., CSS), JAVASCRIPT, interaction data, event handler data, positional data, assets, associated source code, or similar. Such data may be displayed for any or all state views of the stateful widget container and/or any or all interactive widgets contained therein.

Figure 9D:
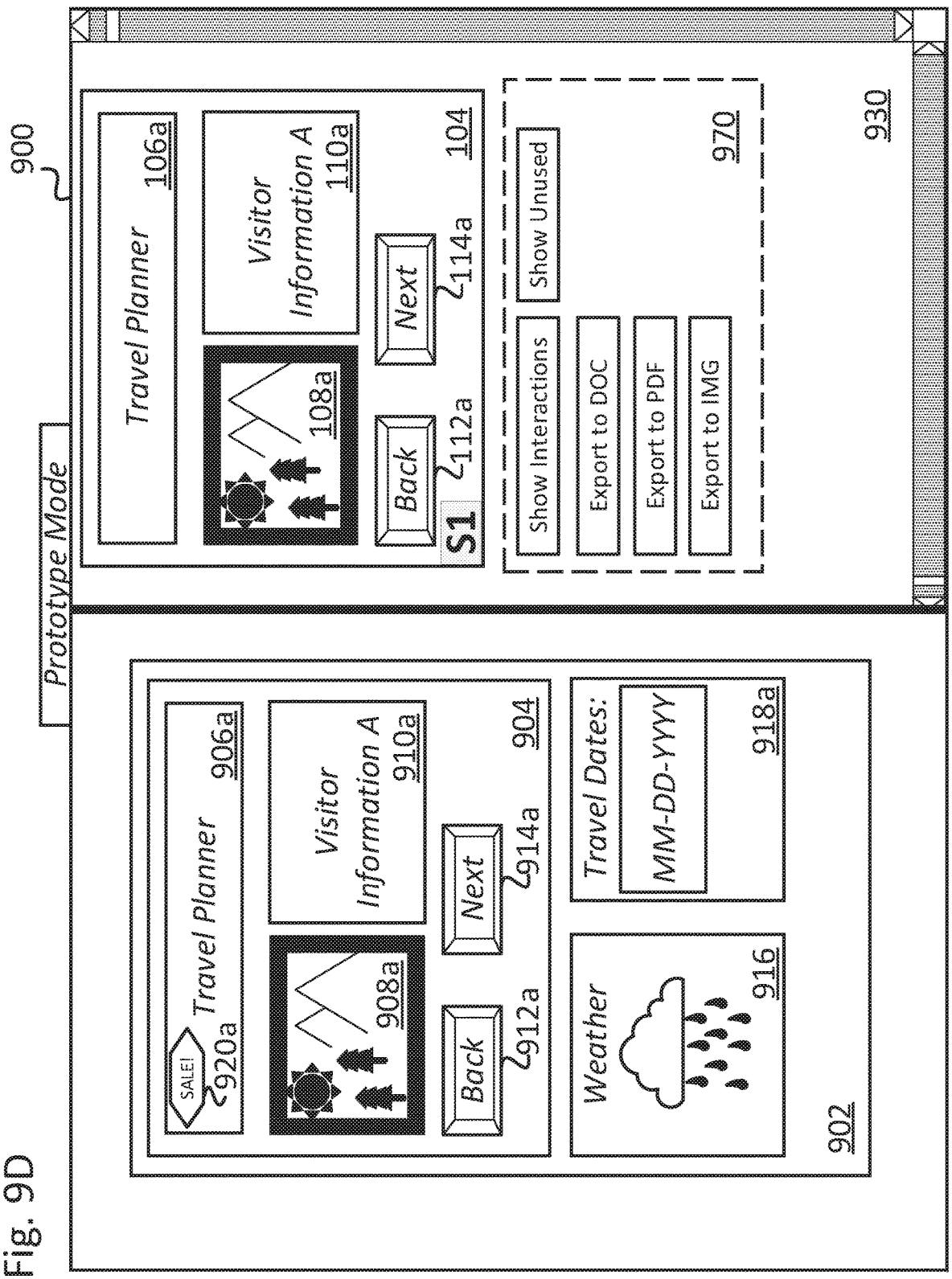

As shown in FIG. 9D, the prototype context region 930 may also include a graphical interface 970 that allow a user to trigger actions associated with the multiple state views of multiple stateful widget containers of the prototype 902 that are displayed concurrently in the prototype context region 930. The actions of the graphical interface 970 include, but are not limited to, a Show Interactions action, a Show Unused action, an Export to Doc action, an export to PDF action, and an Export to IMG action. The Show Interactions action triggers a display within the prototype context region 930 of interactions between the multiple state views of the multiple stateful widget containers of the prototype 902 that is similar to, or the same as, that shown and described with respect to FIG. 4 and FIG. 8. The Show Unused action triggers a display within the prototype context region 930 of which state views of the multiple stateful widgets are not used within the prototype 902 (thereby helping a user determine that there is an error or inefficiency in the prototype 902). The Export to DOC action exports the all-states view of the prototype 902 to a document format (i.e., a non-interactive document). The Export to PDF action exports the all-states view of the prototype 902 to a PDF (Portable-Graphics-Format). The Export to IMG exports the all-states view of the prototype 902 to an image format (e.g., JPEG, GIF, PNG, Animated GIF, or similar).

Figure 10:
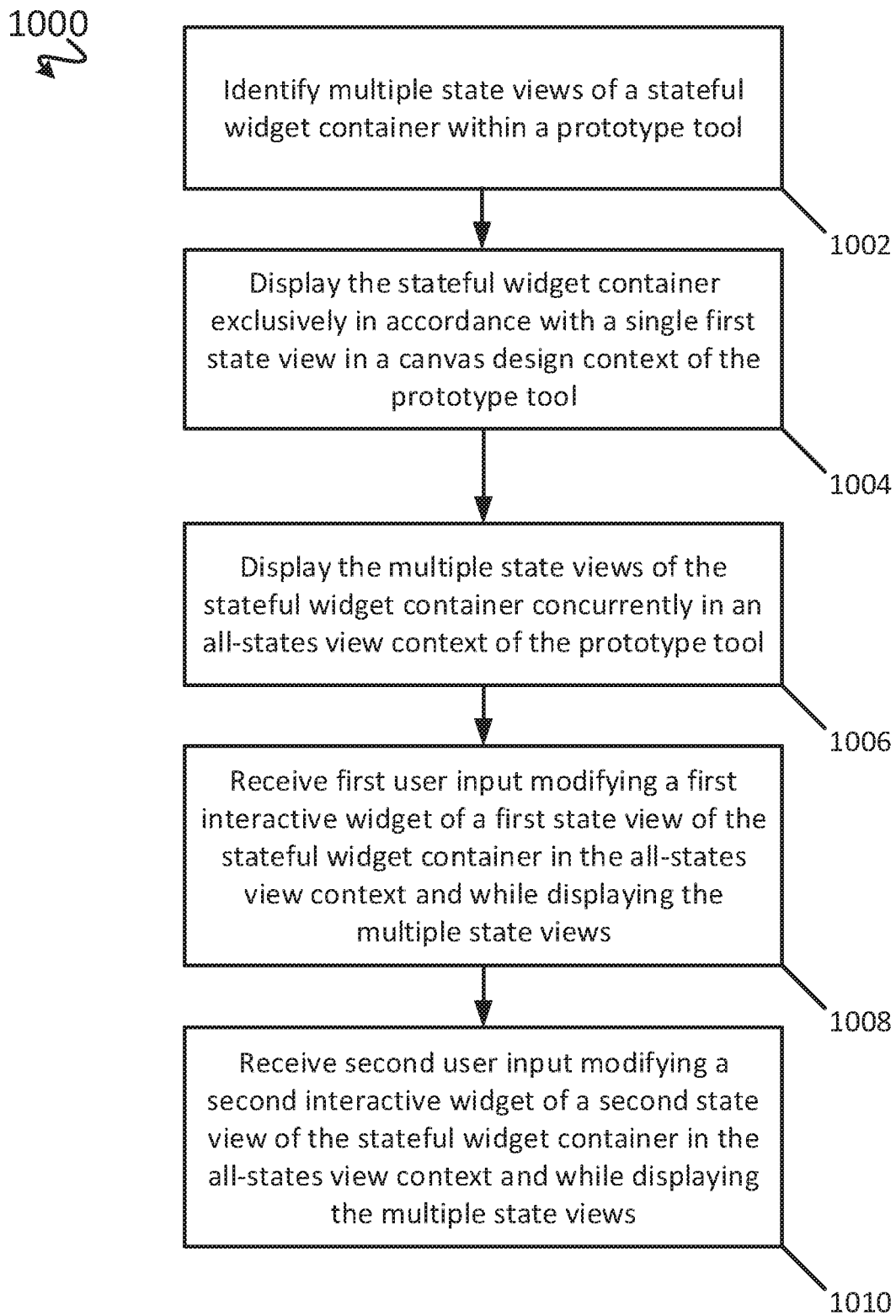
FIG. 10 illustrates a simplified portion of a process for management of stateful containers, in accordance with some embodiments.

FIG. 10 illustrates a simplified portion of a process 1000 for stateful widget container management for interactive designs, in accordance with some embodiments. The particular steps, the order of steps, and the combination of steps are shown for illustrative and explanatory purposes only. Other embodiments can implement different particular steps, orders of steps, and combinations of steps to achieve similar functions or results. At step 1002, multiple state views (e.g., S1 through S3) of a stateful widget container (e.g., 104) are identified within a design tool (e.g., 200). At step 1004, the stateful widget container (e.g., 104) is displayed exclusively (i.e., only one state view is displayed at a time) in accordance with a single first state view (e.g., S1 or S2 or S3) in a canvas design context (e.g., 204) of the design tool (e.g., 200). At step 1006, multiple state views (e.g., S1 and S2 and S3) are displayed concurrently in an all-states view context (e.g., 360) of the design tool (e.g., 200). As disclosed herein, the design tool 200 advantageously enables a user to edit multiple state views concurrently (e.g., S1 and S2 and S3) while they are displayed concurrently. At step 1008, first user input modifying a first interactive widget of a first state view of the stateful widget container is received in the all-states view context and while displaying the multiple state views (e.g., as shown in FIG. 3D, where a graphical position of the interactive widget 114*b* is modified while state views S1, S2, and S3 are displayed). At step 1010, second user input modifying a second interactive widget of a second state view of the stateful widget container is received in the all-states view context and while displaying the multiple state views (e.g., as shown in FIG. 3D, where a graphical position of the interactive widget 120*a* is modified while state views S1, S2, and S3 are displayed).

Figure 11:
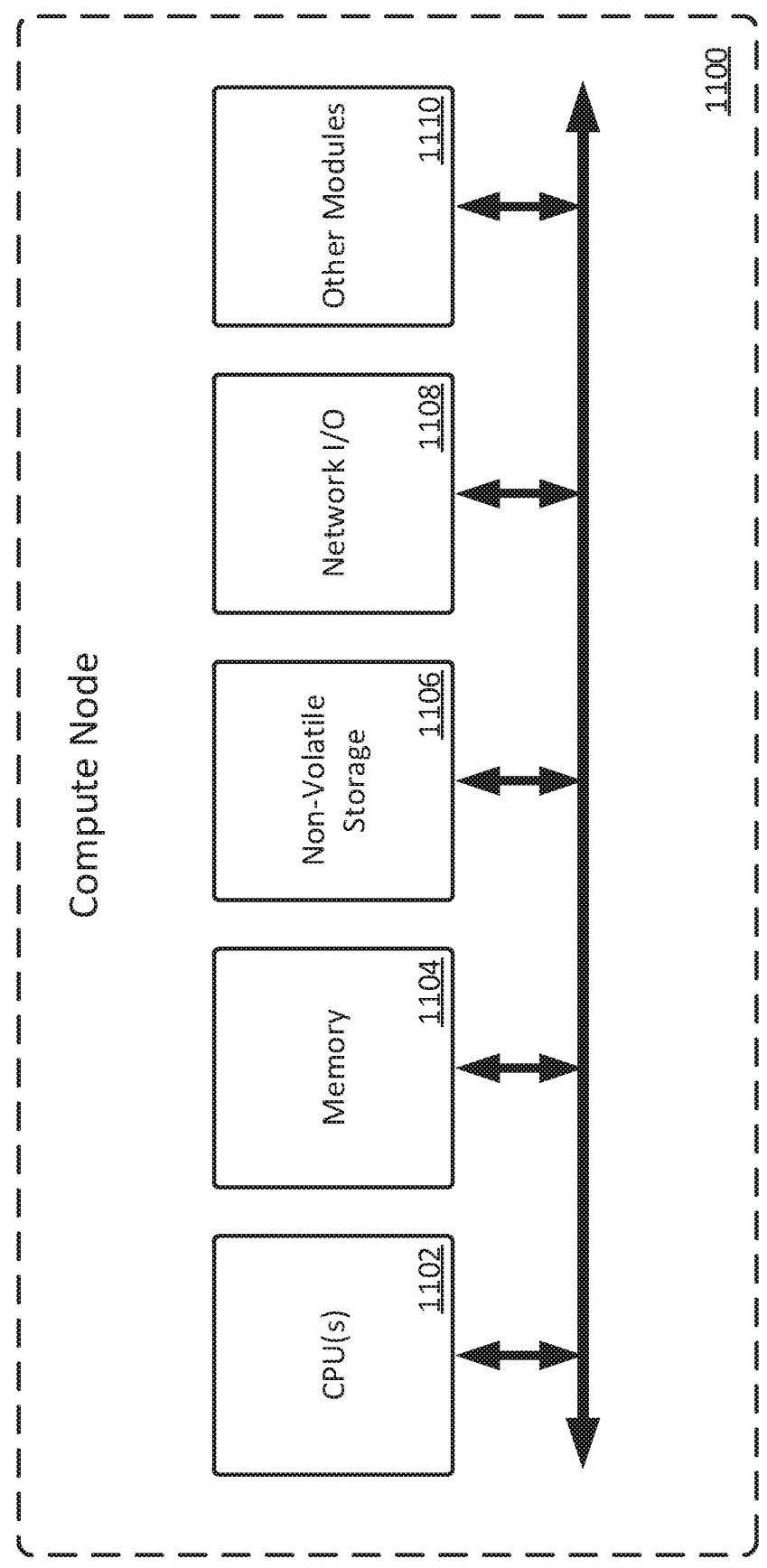
FIG. 11 illustrates a simplified compute node for implementing all or a portion of the management of stateful containers described with reference to FIG. 2 through FIG. 10, in accordance with some embodiments.

FIG. 11 illustrates an example compute node 1100 for implementing all or a portion stateful widget container management described herein, as well as all or part of the process 1000, in accordance with some embodiments. The compute node 1100 generally includes one or more central processing units (CPUs) 1102, a memory module 1104 (e.g., RAM), a non-volatile data storage module 1106 (e.g., a hard drive or array of hard drives), a network I/O module 1108 (e.g., a network interface card (NIC) and/or a top-of-rack interface), and other modules 1110 such as user I/O, wireless communication modules, optical communication modules, system diagnostic or monitoring modules, or other modules, one or more of the modules 1102-1110 being connected by one or more data busses. The non-volatile data storage module 1106 stores data and several programs for some or all of the above-described functions and process steps, among others. The data and programs are loaded into the memory module 1104, so that the one or more CPUs 1102 (in conjunction with the memory module 1104) can perform some or all of the above-described functions and process steps, among others. In some embodiments, the CPUs 1102 are shared or dedicated CPUs. These CPUs could perform a single network function, perform multiple network functions, or perform other tasks in addition to performing network functions. Examples of the CPUs 1102 include microprocessors, digital signal processors, microcontrollers, and dedicated hardware such as ASICs (Application Specific Integrated Circuits) and FPGAs (Field Programmable Gate Arrays).

Reference has been made in detail to embodiments of the disclosed invention, one or more examples of which have been illustrated in the accompanying figures. Each example has been provided by way of explanation of the present technology, not as a limitation of the present technology. In fact, while the specification has been described in detail with respect to specific embodiments of the invention, it will be appreciated that those skilled in the art, upon attaining an understanding of the foregoing, may readily conceive of alterations to, variations of, and equivalents to these embodiments. For instance, features illustrated or described as part of one embodiment may be used with another embodiment to yield a still further embodiment. Thus, it is intended that the present subject matter covers all such modifications and variations within the scope of the appended claims and their equivalents. These and other modifications and variations to the present invention may be practiced by those of ordinary skill in the art, without departing from the scope of the present invention, which is more particularly set forth in the appended claims. Furthermore, those of ordinary skill in the art will appreciate that the foregoing description is by way of example only, and is not intended to limit the invention.

What is claimed is:

1. A method comprising:
   identifying, in a design tool having a canvas design context and an all-states view design context, a plurality of state views of a first stateful widget container of an interactive design, each state view of the first stateful widget container being associated with a unique state of the first stateful widget container;
   displaying, in the canvas design context, the first stateful widget container in accordance with a first state view of the plurality of state views, no other state view of the first stateful widget container being displayed concurrently in the canvas design context;
   displaying, in the all-states view design context, the plurality of state views of the first stateful widget container concurrently, an internal widget layout of each respective state view of the plurality of state views corresponding to that of that respective state view when displayed in the canvas design context;
   receiving, in the all-states view design context, first user input at a first interactive widget within the first stateful widget container, the first interactive widget being associated with the first state view of the first stateful widget container;
   receiving, in the all-states view design context, second user input changing a graphical position of the first state view of the first stateful widget container graphically relative to a graphical position of a second state view of the first stateful widget container; and
   setting which state view is associated with the first state view of the first stateful widget container when viewed in the canvas design context in accordance with the graphical position of the first state view graphically relative to the graphical position of the second state view of the first stateful widget container in the all-states view design context;

wherein the method further comprises:

identifying, in the design tool, a second plurality of state views of a second stateful widget container of the interactive design, each state view of the second stateful widget container being associated with a unique state of the second stateful widget container;

displaying, in the canvas design context, the second stateful widget container concurrently with the first stateful widget container and in accordance with a third state view of the second plurality of state views of the second stateful widget container, no other state view of the second stateful widget container being displayed concurrently in the canvas design context; and displaying, in the all-states view design context, the second plurality of state views of the second stateful widget container concurrently.

2. The method of claim 1, wherein:
the first stateful widget container comprises one or more interactive widgets in at least one state view.

3. The method of claim 1, wherein:
each state view of the first stateful widget container is displayed in the all-states view design context with a same graphical dimension as when that state view is displayed in the canvas design context.

4. The method of claim 1, wherein:
the first user input modifies a state or property of the first interactive widget.

5. The method of claim 1, wherein:
the first user input triggers an interaction of the first interactive widget.

6. The method of claim 1, further comprising:
displaying, in the all-states view design context, an interaction relationship between the first state view of the first stateful widget container and the second state view of the first stateful widget container.

7. The method of claim 1, further comprising:
receiving, in the all-states view design context, third user input to add a second interactive widget to the first state view of the first stateful widget container;

wherein:
the second interactive widget was added to the first state view of the first stateful widget container by moving the second interactive widget from the second state view of the first stateful widget container, or by duplicating the second interactive widget from the second state view of the first stateful widget container.

8. The method of claim 1, further comprising:
displaying, in the all-states view design context, an indication that all or a portion of the first interactive widget exceeds a graphical boundary of the first state view of the first stateful widget container, the indication being associated with the first stateful widget container.

9. The method of claim 1, further comprising:
receiving, in the all-states view design context, third user input to change a property of the first state view of the first stateful widget container.

10. The method of claim 9, wherein:
the property is one of a graphical indication that the first state view of the first stateful widget container is a favorite state view, a graphical indication that the first state view of the first stateful widget container is a locked state view, or a graphical indication that the first state view of the first stateful widget container is a hidden state view.

11. The method of claim 1, further comprising:
receiving, in the all-states view design context, third user input to change a property of the first stateful widget container in accordance with the first state view of the first stateful widget container.

12. The method of claim 11, wherein:
the property is one of a scroll property of the first stateful widget container or an expansion property of the first stateful widget container.

13. The method of claim 1, further comprising:
displaying, in the all-states view design context, a property of the first state view of the first stateful widget container.

14. The method of claim 13, wherein:
the property is one of a graphical indication of last edited time, a graphical indication of whether the first state view of the first stateful widget container is used in an interaction in the canvas design context, a graphical indication of whether the first state view of the first stateful widget container is being edited by another user of the design tool, or a graphical indication of whether the first state view of the first stateful widget container has been edited by another user of the design tool.

15. The method of claim 1, further comprising:
receiving, in the all-states view design context, third user input selecting an interactive widget of the first stateful widget container in the first state view of the first stateful widget container;

receiving, in the all-states view design context, fourth user input selecting the interactive widget in the second state view of the first stateful widget container; and receiving, in the all-states view design context, fifth user input changing a property of the interactive widget, the property of the interactive widget being changed concurrently in the first state view of the first stateful widget container and the second state view of the first stateful widget container.

16. The method of claim 1, further comprising:
receiving, in the all-states view design context, third user input resetting the graphical position of the first state view of the first stateful widget container relative to the second state view of the first stateful widget container to a previous or preferred graphical position of the first state view of the first stateful widget container relative to the second state view of the first stateful widget container.

17. The method of claim 1, further comprising:
receiving, in the all-states view design context, third user input graphically positioning the second state view of the first stateful widget container to overlap the first state view of the first stateful widget container such that graphical differences between the first state view of the first stateful widget container and the second state view of the first stateful widget container are visible to a user of the design tool.

18. The method of claim 1, further comprising:
displaying the first stateful widget container in the canvas design context graphically adjacent to one or more second interactive widgets of the interactive design that are not within the first stateful widget container; and displaying, in the all-states view design context, one or more of the plurality of state views graphically adjacent to the one or more second interactive widgets from the interactive design that are not within the first stateful widget container.

19. The method of claim 1, further comprising:

exporting, from the canvas design context, a prototype of the interactive design;

identifying, in a prototype environment having a prototype view context and an all-states view prototype context, the plurality of state views of the first stateful widget container of the prototype;

displaying, in the prototype view context, the first stateful widget container of the prototype in accordance with the first state view of the plurality of state views, no other state view of the first stateful widget container being displayed concurrently in the prototype view context; and displaying, in the all-states view prototype context, the plurality of state views of the first stateful widget container concurrently, the internal widget layout of each state view corresponding to that of the state view when displayed in the prototype view context.

20. The method of claim 19, further comprising:

displaying, in the all-states view prototype context, styling and interactivity information associated with the first stateful widget container or interactive widgets therein in accordance with each of the plurality of state views.

21. The method of claim 19, further comprising:

displaying, in the all-states view prototype context, usage statistics associated with the first stateful widget container or interactive widgets therein in accordance with each of the plurality of state views.

22. The method of claim 19, further comprising:

rendering a representation of the plurality of state views to a non-interactive document.

23. The method of claim 1, further comprising:

receiving, in the all-states view design context, third user input to duplicate one or more selected state views in a respective new state view of the first stateful widget container.

24. The method of claim 1, wherein:

the first stateful widget container is an interactive widget that comprises one or more other interactive widgets within the first stateful widget container.

* * * * *